United States Patent
Nutaro et al.

(10) Patent No.: US 9,811,950 B2
(45) Date of Patent: Nov. 7, 2017

(54) AIRCRAFT ELECTRIC TAXI SYSTEM DIAGNOSTIC AND PROGNOSTIC EVALUATION SYSTEM AND METHOD

(71) Applicant: HONEYWELL INTERNATIONAL INC., Morristown, NJ (US)

(72) Inventors: Joseph Nutaro, Phoenix, AZ (US);
Stephen Abel, Chandler, AZ (US);
Grant Gordon, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 235 days.

(21) Appl. No.: 14/490,495

(22) Filed: Sep. 18, 2014

(65) Prior Publication Data
US 2016/0086396 A1    Mar. 24, 2016

(51) Int. Cl.
*G07C 5/08*    (2006.01)
*B64C 25/40*   (2006.01)

(52) U.S. Cl.
CPC .......... *G07C 5/0808* (2013.01); *B64C 25/405* (2013.01); *Y02T 50/823* (2013.01)

(58) Field of Classification Search
None
See application file for complete search history.

(56) References Cited

U.S. PATENT DOCUMENTS

| 7,606,641 | B2 | 10/2009 | Allen | |
| 8,509,990 | B2 | 8/2013 | Bennett et al. | |
| 8,620,493 | B2 | 12/2013 | Hughes et al. | |
| 8,676,399 | B2 | 3/2014 | Nutaro et al. | |
| 2007/0032921 | A1* | 2/2007 | Allen | G01C 23/005 701/3 |
| 2008/0147252 | A1* | 6/2008 | Bayer | B64C 25/50 701/3 |
| 2009/0005974 | A1* | 1/2009 | Lenneman | G01C 21/3469 701/533 |
| 2009/0112535 | A1* | 4/2009 | Phillips | G06Q 10/04 703/2 |
| 2010/0204909 | A1* | 8/2010 | Gayraud | G05D 1/0083 701/120 |
| 2015/0151835 | A1* | 6/2015 | Cox | B64C 25/405 244/50 |

OTHER PUBLICATIONS

The Boeing Company, Fuel Performance Management, 2011, Booklet.

* cited by examiner

*Primary Examiner* — Abby Lin
*Assistant Examiner* — Paul Castro
(74) *Attorney, Agent, or Firm* — Shimokaji IP

(57) ABSTRACT

An aircraft electric taxi system diagnostics and prognostics evaluation method, including receiving, with a computer, an electronically recorded first performance parameter of a first electric taxi system of a first aircraft during a taxi operational event at an airport; and comparing the first performance parameter with a first performance factor statistical model generated in response to the first performance parameter and first comparative performance parameters; and calculating a first performance parameter difference based on the comparison.

14 Claims, 16 Drawing Sheets

AIRCRAFT ELECTRIC TAXI SYSTEM DIAGNOSTIC AND PROGNOSTIC EVALUATION SYSTEM AND METHOD

BACKGROUND OF THE INVENTION

The present invention generally relates to a fault detection and operational evaluation system and method for diagnostics and prognostics of electric taxi systems used in aircraft Fault detection of components and monitoring of wear may be used to detect and predict impending failure on an electric taxi system (ETS) of an aircraft to allow maintenance to be performed before a serious problem or failure develops. This allows the maintenance to be scheduled without immediately taking an aircraft out of service. Diagnostics and prognostics for a complex system, such as an ETS, with many variables that affect performance may be difficult even when computer models are available.

Providing motive power for an aircraft during taxis with an ETS, as opposed to the main engines, may provide fuel savings. However, to achieve maximum fuel savings the aircraft may need to be operated at an optimum speed. In addition, at some airports, in some locations, during some environmental events, it may be more efficient to provide motive power with the main engines of the aircraft.

As can be seen, there may be an ongoing need to predict component and system wear, to detect faults and precursors to faults, to predict impending failure, to predict when maintenance of those components and systems may be needed, and/or to evaluate fuel and other efficiencies of aircraft with ETS systems.

SUMMARY OF THE INVENTION

In one aspect of the present invention, an aircraft electric taxi system diagnostics and prognostics evaluation method, comprises receiving, with a computer, an electronically recorded first performance parameter of a first electric taxi system of a first aircraft during a taxi operational event at an airport; receiving, with the computer, electronically recorded first comparative performance parameters corresponding to the first performance parameter from electric taxi systems of multiple aircraft during a corresponding taxi operational event at the airport; generating, with a computer, a first performance factor statistical model in response to the first performance parameter and the first comparative performance parameters; comparing the first performance parameter with the first performance factor statistical model; and calculating a first performance parameter difference based on the comparison; and generating a first aircraft electric taxi system maintenance problem report when the first performance parameter difference exceeds a predetermined acceptable first performance parameter difference value.

In another aspect of the present invention, an aircraft electric taxi system operational evaluation method comprises receiving, with a computer, electronically recorded taxi data and aircraft identification information from a first aircraft with an electric taxi system, the taxi data including periodic position and corresponding auxiliary power unit status, electric taxi system status, and aircraft speed for each first aircraft takeoff and each first aircraft landing for a predetermined fuel reporting period; determining, with the computer, electric taxi system use periods during all first aircraft taxis to takeoff or first aircraft taxi after landings for the predetermined fuel reporting period during which motive power was supplied to the first aircraft from the electric taxi system, in response to the taxi data; determining, with a computer, an electric taxi system configuration, an aircraft configuration, and a main engine configuration of the first aircraft in response to the aircraft identification information; estimating, with a computer electric taxi system performance model, an amount of fuel used by an APU of the first aircraft to power the ETS system during each electric taxi system use period in response to the taxi data and the electric taxi system configuration; estimating, with a computer aircraft performance model, an amount of fuel which would have been used by the main engines of the first aircraft during each electric taxi system use period if main engines of the first aircraft had supplied motive power to the first aircraft, in response to the taxi data, aircraft configuration, and main engine configuration; and calculating with a computer, a first aircraft amount of fuel saved based on the amount of fuel used by the APU and the amount of fuel which would have been used by the main engines for at least one first aircraft takeoff or first aircraft landing during the fuel reporting period.

In yet another aspect of the present invention, an aircraft model electric taxi system operational evaluation method for an airport comprises receiving, with a computer, electronically recorded taxi data and associated aircraft identification information from multiple aircrafts with electric taxi systems during a predetermined fuel reporting period; the taxi data including periodic position and corresponding auxiliary power unit status, electric taxi system status, electric taxi motor voltage, electric taxi motor current, and aircraft speed during taxis at an airport; determining, with the computer, for each taxi of each aircraft at the airport an electric taxi system portion of the taxi during which motive power was supplied by the electric taxi system of the aircraft in response to the taxi data; determining, with the computer, for each taxi of each aircraft at the airport a main engine portion of the taxi during which motive power was supplied by the main engines of the aircraft in response to the taxi data; estimating, with a computer electric taxi system performance model, an electric taxi system fuel consumption of each aircraft during each electric taxi system portion in response to the taxi data and the associated aircraft identification information; estimating, with a computer aircraft performance model including a main engine model, a main engine fuel consumption of each aircraft during each main engine portion in response to the taxi data and the associated aircraft identification information; estimating, with a computer electric taxi system performance model, a theoretical electric taxi system fuel consumption of each aircraft during each main engine portion if the electric taxi system had supplied the motive power for the aircraft in response to the taxi data and the associated aircraft identification information; estimating, with a computer aircraft performance model including a main engine model, a theoretical main engine fuel consumption of each aircraft during each electric taxi portion if the main engines had supplied the motive power in response to the taxi data and the associated aircraft identification information; and calculating, with a computer, a possible electric taxi system fuel savings for the airport in response to the difference between the combination of the electric taxi system fuel consumption and the theoretical electric taxi fuel consumption, and the combination of the main engine fuel consumption and the theoretical main engine fuel consumption.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a system and method for predicting maintenance needed on an aircraft ETS system, and evaluating the operation of an ETS system on an aircraft for fuel and other efficiencies. In general, the system and method may monitor the operation of multiple aircraft (possibly hundreds or thousands) with ETS and determine if a subtle abnormality occurs in one or more of the ETS systems. The abnormality may be flagged on a report such that it may be explored more closely by appropriate systems or persons. Many factors may affect fuel and other efficiencies of the ETS system. These include environmental events—such as rain or snow on runways, or high winds in certain directions. The geographical location and lay-out of an airport also effects efficiencies. By monitoring operating parameters of aircrafts, such as fuel efficiency and use of the ETS system, optimal speeds for achieving fuel efficiencies at different airports, at different locations, during certain taxi operational events and environmental events may be determined. In addition, savings by using ETS, or missed savings by not using ETS may be calculated and reported for individual aircraft, aircraft crews, aircraft fleets, airports, and environmental events.

Figure 1:
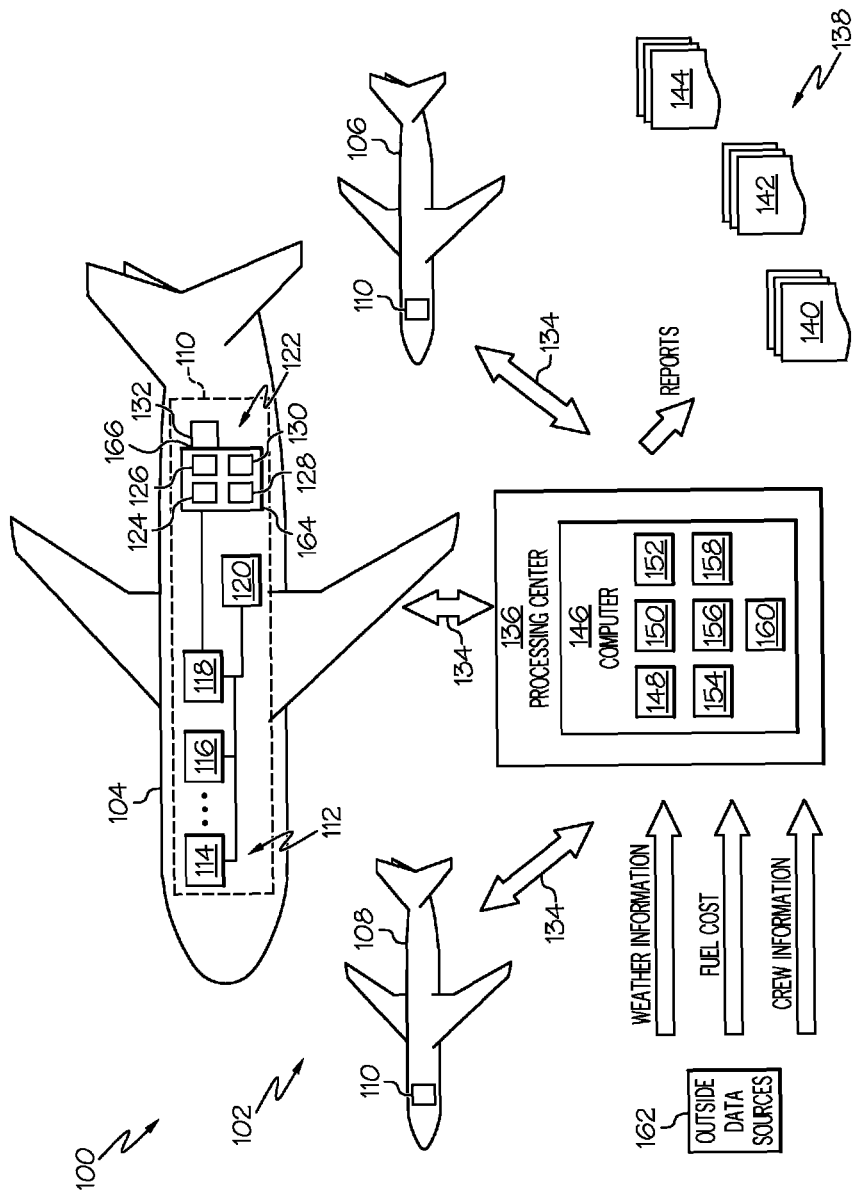
FIG. 1 is a block diagram of a fault detection and operational evaluation system for diagnostic and prognostics of aircraft with ETS according to an exemplary embodiment of the present invention.

Referring now to FIG. 1, a block diagram of an exemplary fault detection and operational evaluation system 100 for aircraft with ETS is illustrated. The system 100 may include multiple aircraft 102, a processing center 136, and outside data sources 162. The multiple aircraft 102 may each include a model and configuration. A first aircraft 104, a second aircraft 106, and a third aircraft 108 are illustrated, but the multiple aircraft 102 may include many other aircrafts, for example hundreds or thousands of aircraft.

Each of the multiple aircraft 102 may include a system 110 to record taxi data including periodic position and corresponding auxiliary power unit status, electric taxi system status, electric taxi motor voltage, electric taxi motor current, and aircraft speed for each taxi and transmit to the processing center 136 the taxi data and aircraft identification information. Many embodiments of system 110 will be apparent to a person skilled in the art. One exemplary embodiment of system 110 is illustrated in relation to the first aircraft 104.

The system 110 on the first aircraft 104 may include an aircraft controller 112 to receive signals indicative of operating and performance parameters of the first aircraft; calculate, estimate, or predict operating and performance parameters in response to the signals and transmit these parameters to an electronic device 122. Although the aircraft controller 112 may be one unit, the controller 112 may include multiple avionic control units such as a GPS unit, a motor controller, and a flight controller (not shown). An exemplary embodiment of aircraft controller 112 including a first aircraft controller 114, and a second aircraft controller 116 is illustrated. A person skilled in the art will realize that many embodiments are possible.

The electronic device 122 may include any electronic device configured to electronically record taxi data at predetermined times and transmit the taxi data to transmit the data to the processing center 136. In some embodiments, the taxi data may be transmitted to the processing center 136 via wireless communication links 134. In other embodiments, the taxi data may be recorded on a removable memory device 132, such as a memory stick, and manually transmitted to the processing center 136.

In one embodiment, the electronic device 122 may include an electronic flight bag 164. In other embodiments, the electronic device 122 may be a tablet, a phone, a device built into the first aircraft 104, or any other electronic device which is operable to configured to electronically record taxi data at predetermined times and transmit the taxi data to transmit the data to the processing center 136.

The electronic flight bag 164 may include a processor 124, a memory device 126, a display 128, taxi data recording and transmission software 130, and a port 166 for receiving a removable memory device 132. The electronic flightbag 164 may be communicatively linked an aircraft interface unit 118, by for example Ethernet, for receiving signals indicative of first aircraft 104 operating and performance parameters from aircraft controller 112. The electronic flightbag 164 may be communicatively linked to an aircraft communication unit 120, such as an on-board router with firewalls, to transmit data to the processing center 136 through communication links 134. Communications links 134 may include, for example, satellite communication links, and/or the Aircraft Communications Addressing and Reporting System (ACARS).

The processor 124 may include microprocessors or other processors as known in the art. In some embodiments the processor 124 may include multiple processors. The processor 124 may execute instructions from the taxi data recording and transmission software 130, as described below and in relation to FIGS. 4A, 4B, and 5-8, which may record, store, and/or transmit taxi data and aircraft identification to the processing center 136. Such instructions may be read into or incorporated into a computer readable medium, such as the memory component 126, or provided external to processor 124. The instructions may include multiple lines or divisions of code. The lines or divisions of code may not be consecutive order, and may not be located in the same section of code. In alternative embodiments, hard-wired circuitry may be used in place of or in combination with software instructions as described above, below, or in relation to the drawings.

The term "computer-readable medium" as used herein refers to any non-transitory medium or combination of media that participates in providing instructions to the processor 124 for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

The processing center 136 may produce reports 138 in response to the taxi data and aircraft identification data transmitted by the recording systems 110 of the multiple aircraft 102 and/or information such as weather information, fuel cost, and crew information from outside data sources 162. The reports 138 may include, for example, a first aircraft ETS diagnostic and prognostic report 140, a second aircraft diagnostic and prognostic report 142, and/or aircraft, fleet, crew, and/or airport ETS efficiency reports 144. The reports 138 may be produced using methods as described below and/or illustrated in FIGS. 3A, 3B, 4A, 4B, 5-8, and 9A-9F.

The processing center 136 may include a computer 146. The computer may include a processor 148, a memory device 150, an ETS computer performance model 152, an aircraft computer performance model 154, an engine computer performance model 156, an airport database 158, and/or an aircraft database 160. Although the processing center 136 is illustrated as a single center with a single computer 146, processing center 136 may include multiple centers in multiple physical locations. Each of the one or multiple centers may include one or more computer units which may be networked together, as known in the art, to form the computer 146. The computer 146 may perform additional functions not detailed in this description in addition to the methods described below and illustrated in FIGS. 3A, 3B, 4A, 4B, 5-8, and 9A-9F.

The processor 148 may include microprocessors or other processors as known in the art. In some embodiments the processor 148 may include multiple processors. The computer 146 may execute instructions, as described below and in relation to FIGS. 3A, 3B, 4A, 4B, 5-8, and 9A-9F, which may produce reports 138. Such instructions may be read into or incorporated into a computer readable medium, such as the memory device 150, or provided external to processor 148. The instructions may include multiple lines or divisions of code. The lines or divisions of code may not be consecutive order, and may not be located in the same section of code. In alternative embodiments, hard-wired circuitry may be used in place of or in combination with software instructions as described above, below, or in relation to the drawings.

The term "computer-readable medium" as used herein refers to any non-transitory medium or combination of media that participates in providing instructions to the processor 148 for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

The ETS computer performance model 152 may be configured to predict performance parameters of the ETS on an aircraft during operational events, as a function of operating parameters, ETS configuration, aircraft configuration, location information, and/or environmental events. The ETS computer performance model 152 may also be configured to predict fuel use of the ETS on an aircraft during taxis, as a function of operating parameters, ETS configuration, and aircraft configuration, location information, and/or environmental events.

The engine computer performance model 156 may be configured predict fuel use of main engines of an aircraft as a function of operating parameters, aircraft configuration, location information, and/or environmental events. The aircraft computer performance model 154 may be configured predict fuel use of an aircraft for motive power during taxis when main engines are used, as a function of operating parameters, aircraft configuration, location information, information from the engine computer performance model 156, and/or environmental events.

The airport database 158 may include information on airports where the multiple aircraft 102 may taxi. This information may include geographic information on all runways and taxiways the multiple aircraft may travel on during taxis. For example, locations, grades, turns and other information which may affect multiple aircraft 102 performance may be included.

The aircraft database 160 may include information on the multiple aircraft 102. This information may include configuration of systems and components including the main engines, and the ETS. The information may be classified by, for example, tail model. The aircraft database 160 may be updated periodically by airlines to reflect any changes to an aircraft during maintenance. The aircraft database 160 may also include correlation data between anomalies in performance of systems and components in a configuration or aircraft model and corresponding fault conditions. The aircraft 160 may also include maintenance advice corresponding to particular fault conditions.

Figure 2:
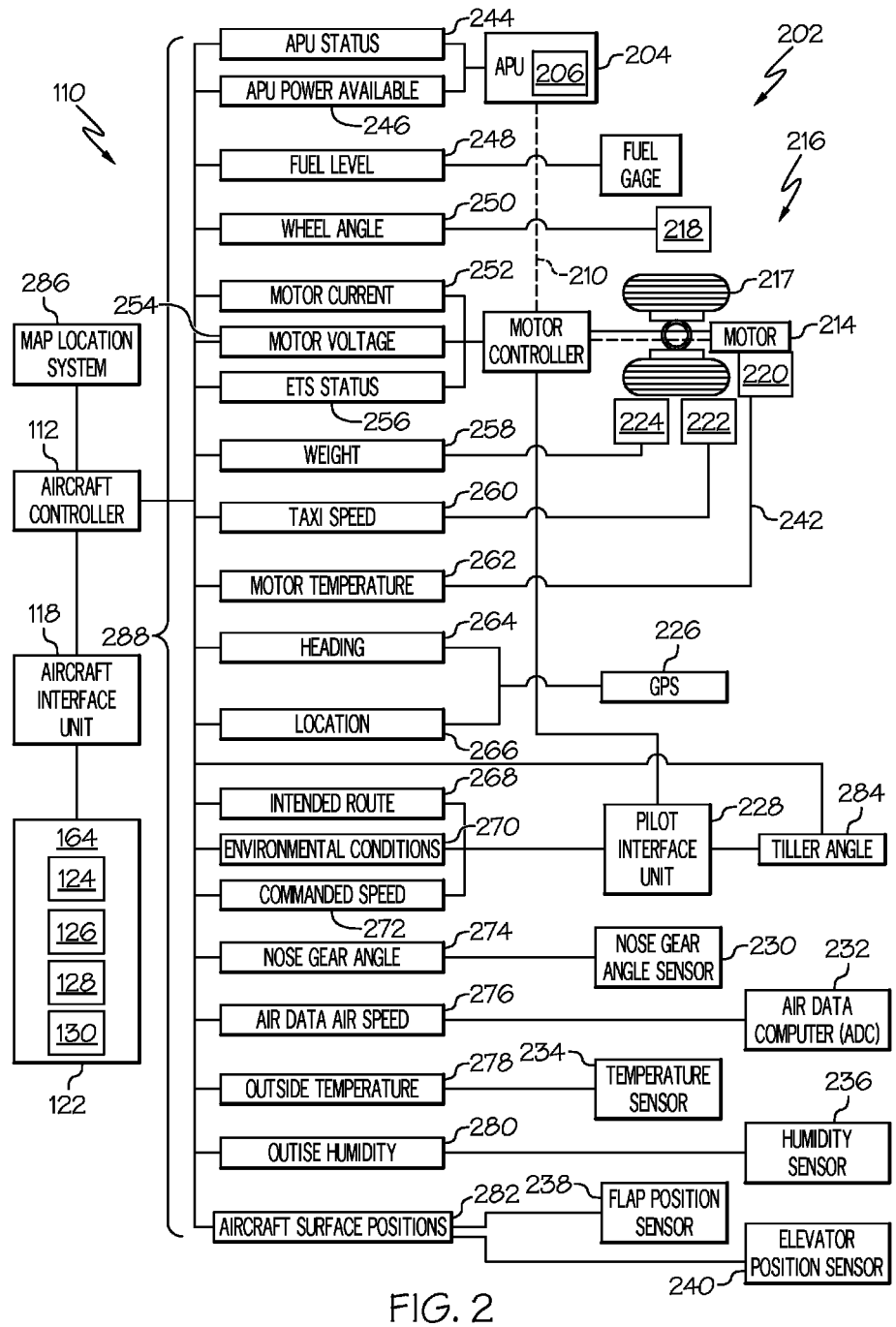
FIG. 2 is a block diagram of an aircraft taxi and performance data electronic recording system according to an exemplary embodiment of the present invention.

Referring now to FIG. 2, a block diagram of an exemplary embodiment of the aircraft taxi and performance data electronic recording system 110 is illustrated. Elements or components in FIG. 2 which are similar to ones in FIG. 1 are labeled with the same element numbers and will not be described again. Components and systems of one of the multiple aircraft 102 may generate operating and performance parameter signals 288 which may be transmitted through communication links 242 (represented in FIG. 2 by solid lines) to the aircraft controller 112, and then to the electronic device 122. From here on in the description the components and systems will be referred to in relation to the first aircraft 104, but may be included in any of the multiple aircraft 102.

The first aircraft 104 may include an ETS system 202 which may include one or more landing assemblies 216. One or more of the landing assemblies 216 may include one or more motors 214 and corresponding one or more temperature sensors 220. A motor controller 212 may be communicatively and electrically connected to each of the motors 214 through a communication link 242 and a power link 210 to monitor and/or control voltage and current to each of the motors 214. Power links 210 in FIG. 2 are shown as dashed lines. In some embodiments each motor 214 will correspond to a separate motor controller 212, but in other embodiments a single motor controller 212 may control and/or monitor multiple motors 214. Each of the motor controllers 214 may generate a motor current signal 252 indicative of the current of one or more of the motors 214, a motor voltage signal 254 indicative of the voltage of one or more of the motors 214, and an ETS status signal 256 indicative of whether the ETS system 202 is providing motive power for the first aircraft 104 and how much motive power the ETS system 202 is providing. Each of the motor controllers 214 may be communicatively linked to the aircraft controller 112.

An auxiliary power unit (APU) 204 may be electrically connected through a power link 210 to provide electrical power to the ETS through motor controllers 212. The APU 204 may include an APU electronic controller 206. The APU electronic controller 206 may be configured to generate an APU status signal 244 indicative of whether the APU 204 is providing power to any first aircraft 104 components or systems including the ETS, and/or how much power the APU 204 is providing to the ETS. The APU electronic controller 206 may also generate an APU power available signal 246 indicative of the power available from the APU 204. The APU electronic controller 206 may be communicatively linked to the aircraft controller 112. Fuel may be provided to the APU 204 from one or more fuel tanks (not shown). The one or more fuel tanks may or may not also provide fuel to the main engines of first aircraft 104. Each of one or more fuel tanks may include a fuel gauge system 208. The fuel gauge system 208 may generate a fuel level signal 248 indicative of the fuel level of the one or more fuel tanks the fuel gauge system 208 is associated with. The fuel gauge system 208 may be communicatively linked to the aircraft controller 112.

The landing gear assembly 216 may include a wheel angle sensor 218, a main gear load sensor 224, and a speed sensor 222. From here on in this description when the landing gear assembly 216 is referred to, the description is referring to one or more of the landing gear assemblies unless stated otherwise. The wheel angle sensor 218 may generate a wheel angle signal 250 indicative of the angle of a wheel 217 of the landing gear assembly 216. The wheel angle sensor 218 may be communicatively linked to the aircraft controller 112. The main gear load sensor 224 may generate a weight signal 258 indicative of the weight load of a main gear of the landing gear assembly 216. The main gear load sensor 224 may be communicatively linked to the aircraft controller 112. The speed sensor 220 may generate a taxi speed signal 260 indicative of the rotational speed of a wheel 217 of the landing gear assembly 216. The speed sensor 222 may be communicatively linked to the aircraft controller 112.

The system 110 may include a GPS system 226 which may generate a heading signal 264 indicative of the heading of the first aircraft 104. The GPS system 226 may also generate a location signal 266 indicative of the location of the first aircraft. The GPS system 226 may be communicatively linked to, or may be a controller unit of the aircraft controller 112.

The system 110 may include a pilot interface unit 228 through which the pilot (or another person) may enter information. The pilot may, for example, enter information indicative of the intended route of the first aircraft 104, environmental conditions affecting the location of the first aircraft 104, a commanded speed for the first aircraft 104, enter a desired nose gear tiller or nose gear angle, or position the nose wheel via a manual tiller-of the first aircraft 104. The pilot interface unit 228 may generate an intended route signal 268 in response to the entered intended route information, an environmental conditions signal 270 in response to the entered environmental conditions information, a commanded speed signal 272 in response to the entered commanded speed information, and/or a tiller angle signal 284 in response to the entered desired tiller angle information. The pilot interface unit 228 may be communicatively linked to the aircraft controller 112.

The system 110 may include a nose gear landing assembly (not shown) of the first aircraft 104 including a nose gear angle sensor 230. The nose gear angle sensor 230 may generate a nose gear angle signal 274 indicative of the angle of the nose gear landing assembly, which may be indicative of the heading of the first aircraft 104. The nose gear angle sensor 230 may be communicatively linked to the aircraft controller 112.

The system 110 may include an air data computer (ADC) 232 configured to provide an air data air speed signal 276, indicative of the speed of the first aircraft 104. The ADC 232 may include, for example, a computer which may determine a calibrated airspeed, Mach number, altitude, and/or altitude trend of the first aircraft 104 from input data from sensors such as an aircraft's pitot-static system (not shown), gyroscopes (not shown), GPS 226 and accelerometers (not shown). The ADC 232 may also receive a data input of total air temperature which may enable the ADC 232 to compute static air temperature and/or calibrated or indicated airspeed.

In The ADC 232 may be communicatively linked to, or may be a controller unit of the aircraft controller 112.

The system 110 may include sensors configured to generate aircraft surface position signals indicative of the position of outside surfaces of the first aircraft 104. For example, the system 110 may include a flap position sensor 238 configured to generate a signal indicative of the position of the flaps on the first aircraft 104. The system 110 may also include, for example, an elevator position sensor 240 configured to generate a signal indicative of the position of the elevators on the first aircraft 104. The flap position sensor 238 and the elevator position sensor 240 may be communicatively linked to the aircraft controller 112.

The system 110 may include a map location system 286 which may generate data signals indicative of the geography of an airport where the first aircraft 104 is located. The map location system 286 may be communicatively linked to the aircraft controller 112.

Figure 3A:
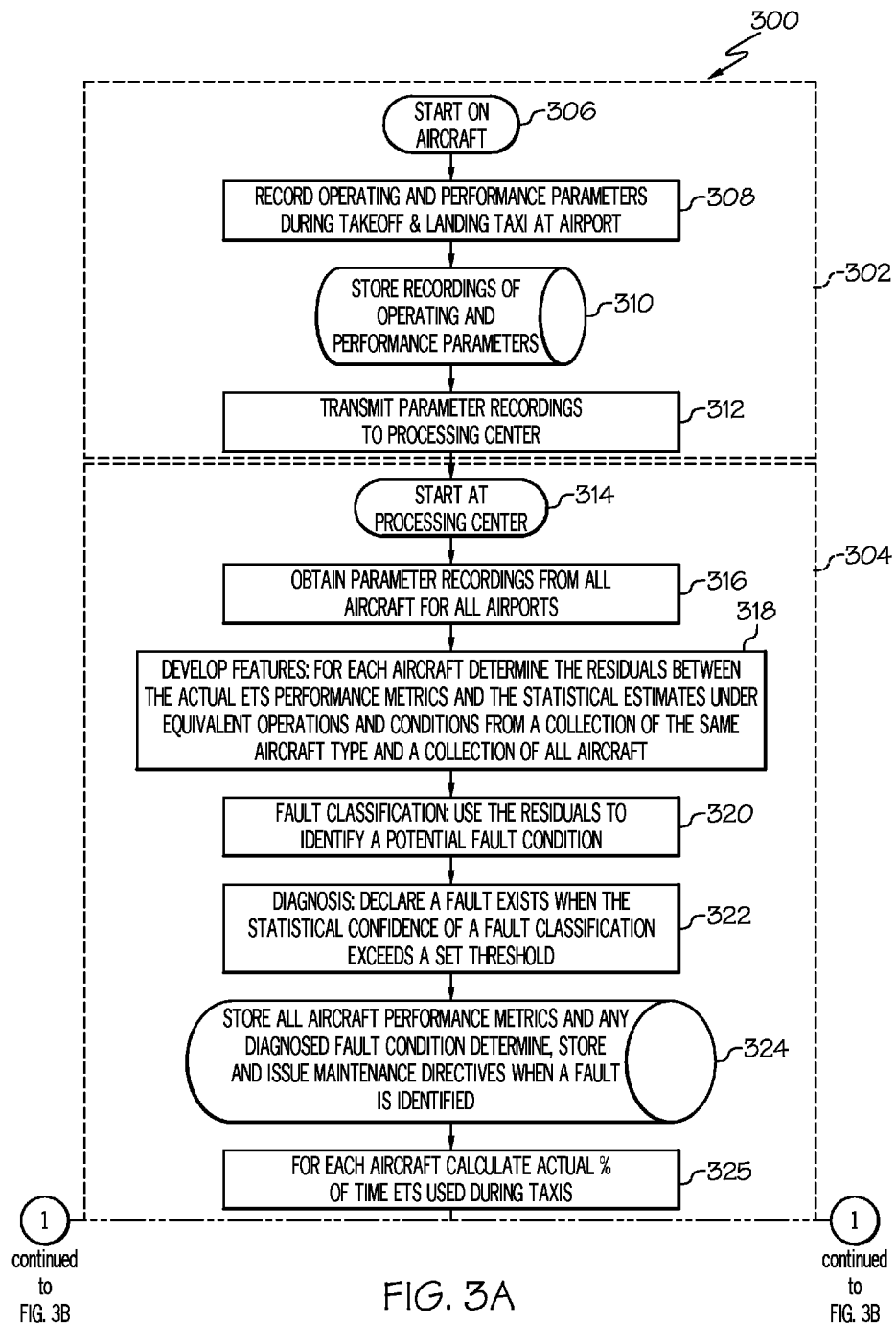
FIG. 3A is a flow chart of a first portion of an aircraft ETS fault detection and operational evaluation method for diagnostic and prognostics according to an exemplary embodiment of the present invention.

Referring now to FIG. 3A, a flow chart of a first portion of an exemplary aircraft ETS fault detection and operational evaluation method for diagnostic and prognostics 300 is illustrated. Steps in the dashed line bordered box 302 may be performed by the electronic device 122 in at least one of the multiple aircraft 102. Exemplary embodiments of these steps will be further described in relation to FIGS. 4A, 4B, and 5-8. Steps in the dashed line bordered box 304 may be performed by the computer 146 at the processing center 136. Exemplary embodiments of these steps will be further described in relation to FIGS. 9A-9F. Steps which may be done for any of the multiple aircraft 102 will be described from here on in the description in relation to the first aircraft 104, but it should be understood that these steps may also, or in the alternative, be performed by any of the multiple aircraft 102. The method 300 starts on the first aircraft 104 (step 306).

First aircraft 104 operating and performance parameters may be electronically recorded with the electronic device 122 during taxi operations such as landings (from a landing site to a gate) and takeoffs (from the gate to a takeoff spot) (step 308). First aircraft 104 operating and performance parameters may be recorded periodically in conjunction with a location of the first aircraft 104 at an airport, and/or a date-time stamp. First aircraft 104 operating parameters may include all or none of, and are not limited to aircraft weight, outside temperature, heading, intended route, nose gear angle, taxi speed, commanded speed, APU status, ETS status, motor current, motor voltage, motor temperature, outside humidity, environmental conditions, aircraft surface positions, and fuel level. First aircraft operating parameters may be determined in response to, and/or as a function of the operating and performance signals 288. First aircraft 104 performance parameters may include all or none of, and are not limited to speed setting, power available from the APU, wheel angle, wheel rotational speed, air data air speed. First aircraft 104 performance parameters may be determined in response to, and/or as a function of the operating and performance signals 288. Which of the available first aircraft 104 operating and performance factors electronically recorded, and when the parameters are recorded may be programmable by authorized persons. For example, airlines or other parties interested in evaluating certain performance characteristics of the first aircraft 104 and/or other of the multiple aircraft 102 may program in times and parameters to be electronically recorded by the electronic device 122.

First aircraft 104 operating and performance parameters electronically recorded may be stored by the electronic device 122, for example, in the memory device 126, and/or on the removable memory device 132 (step 310). When there is an opportunity to transmit the recorded first aircraft 104 operating and performance parameters, the electronic device 122 may transmit them via a wireless communication link 134, or manually using the removable memory device 132 (step 312). The parameters may be transmitted along with aircraft identification information indicative of the model and configuration of the first aircraft 104. For example, the tail number of the first aircraft 104 and/or flight number during which the taxi took place may be transmitted along with the recorded parameters.

Steps 304 at the processing center start at step 314. The computer 146 may receive operating and performance parameter electronic recordings from the multiple aircraft 102 (step 316). The computer 136 may identify in the electronic recordings operational events. The operational events may be any aircraft operation which has been identified to be of interest in predicting system and/or component wear of the aircraft. Specific examples of operational events are described in relation to FIGS. 5-8, but other aircraft operations may also be considered. For each aircraft, recorded performance parameters may be compared with model estimates and/or statistical estimates for the performance metrics evaluated under the equivalent operational conditions. Residuals may be determined based on the comparison (step 318) between the measured and modeled values as well as the measured and statistical estimates for each performance metric. Operating parameters, including environmental conditions, when available, may be used to predict performance parameters. When environmental conditions are not available, the computer 146 may obtain environmental conditions from outside data sources 162.

The computer 146 may use classification techniques to identify which component is failing or has failed and to estimate the extent of the fault. Any number of standard techniques may be used with the residuals to identify or diagnose the fault including alarm bounds, data classification, regression methods, fuzzy logic, neural nets, expert systems, case base reasoning, Bayesian networks and/or Dempster-Shafer theory of evidence (step 320). The computer 146 may base determination of fault conditions at least partially on information in the aircraft database. The computer 146 may determine a statistical confidence of a potential fault classification and if the statistical confidence of the potential fault condition exceeds a predetermined threshold, the computer 146 may determine that a fault exists (step 322). The computer 146 may determine maintenance directives when a fault is determined at least partially based on data from the aircraft database 160. The computer 146 may store any determined fault conditions and maintenance directives with the correlating aircraft identification information in the memory 150 (step 324).

The computer 146 may calculate for each of the multiple aircraft 102 the percentage of time during each taxi that the ETS 202 was used (step 325) in response to the operating parameters recorded. The method 300 may continue to the steps illustrated in FIG. 3B.

Figure 3B:
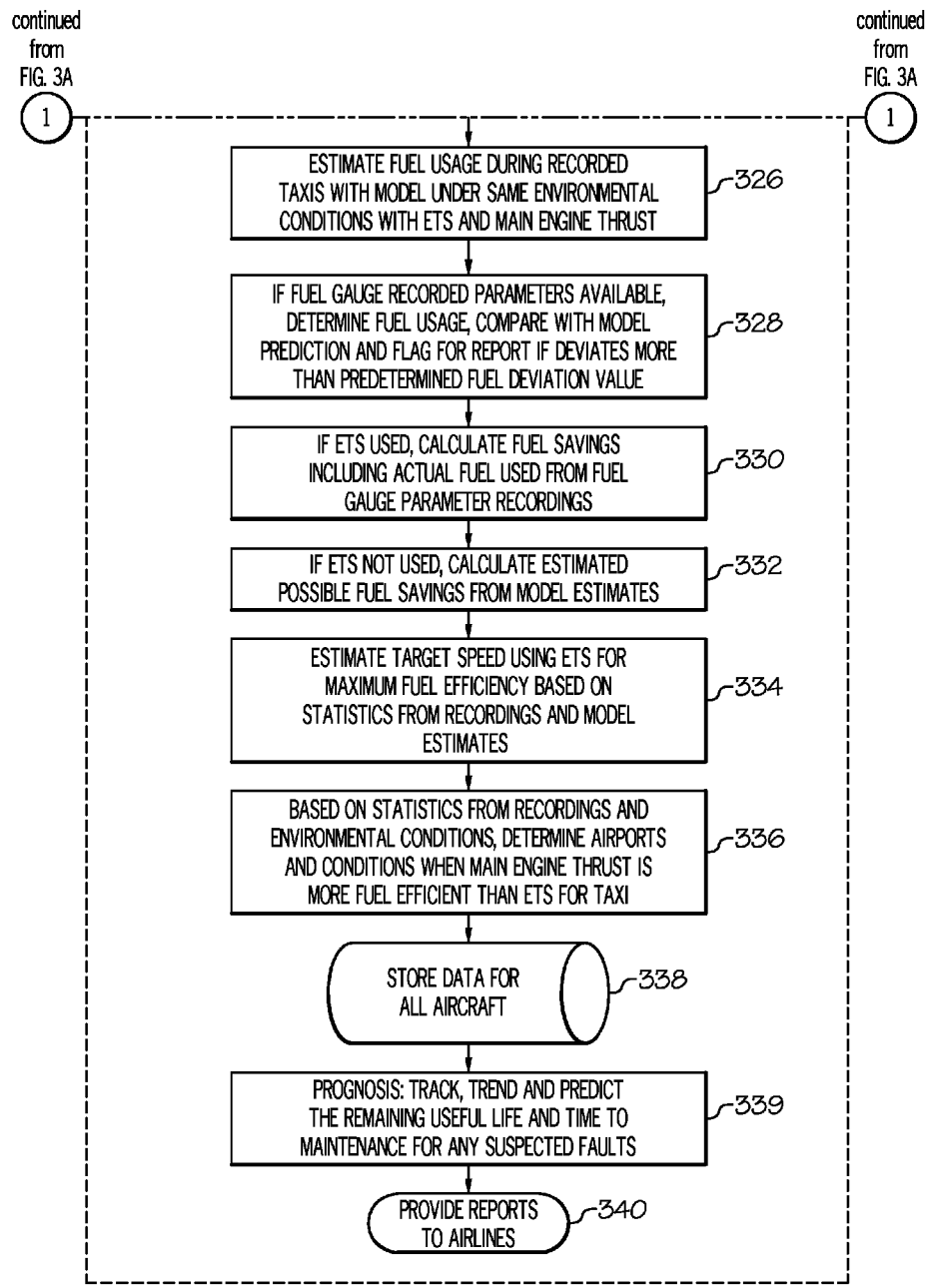
FIG. 3B is a flow chart of a second portion of an aircraft ETS fault detection and operational evaluation method for diagnostic and prognostics according to an exemplary embodiment of the present invention.

Referring now to FIG. 3B, a flow chart of a second portion of an exemplary aircraft ETS fault detection and operational evaluation method for diagnostic and prognostics 300 is illustrated. The computer 146 may estimate for each taxi, for each of the multiple aircraft 102, a predicted fuel use if the ETS 202 was used for motive power, and a predicted fuel use if the main engines were used for motive power, with the ETS computer performance model 152, the aircraft computer performance model 154, and the engine computer performance model 156. Recorded operating parameters, and environmental conditions (either recorded or from an outside data source 162) may be used by the models to predict the fuel use (step 326).

If the first aircraft 104 includes a fuel gauge system 208 and fuel levels were recorded as operating parameters, the computer 146 may determine an actual fuel use of the first aircraft 104 in response to the fuel levels, and compare the actual fuel use with the predicted fuel use estimated with the models 152, 154, 156. If the difference between the actual fuel use and predicted fuel use exceeds a predetermined value or percentage, the computer 146 may flag the first aircraft 104, and taxi for inclusion in a report 138 (step 328).

If the first aircraft 104 used the ETS 202 for motive power during a taxi, the computer 146 may compare the actual fuel use with the predicted fuel use if the main engines had been used for motive power. The computer 146 may calculate a fuel savings in response to the comparison (step 330).

If the first aircraft 104 used the main engines for motive power during a taxi, the computer 146 may compare the actual fuel use with the predicted fuel use if the ETS 202 had been used for motive power. The computer 146 may calculate a possible fuel savings in response to the comparison (step 332).

The computer 146 may estimate target speeds for the multiple aircraft 102. The target speeds may optimize fuel economy or may optimize another desired efficiency such as less wear on a system or component of the multiple aircraft 102. The target speeds may be by aircraft model, by airport, by location in and airport, by operational event, and/or by any other categorization which may be desired (step 334).

The computer 146 may determine in response to the recorded operating and performance parameters that at certain airports, during certain environmental conditions, certain models of aircraft may be more fuel efficient when using the main engines for motive power than using the ETS 202 for motive power. The computer 146 may include this information in reports 138 (step 336).

The computer 146 may store the recorded data from all multiple aircrafts 102 for use in future evaluations (step 338). The computer 146 may use known prognostic methods to predict the remaining useful life of a system or component of an aircraft for which a potential fault and/or fault has been determined. The computer 146 may, for example use trending, a Weibull model, physics based failure models, system identification, particle filters and/or data driven techniques. Methods used may be included in the memory 150 or any of the databases 152, 154, 156 (step 339). The computer 146 may then issue reports 138 to airlines or other interested parties (step 340).

Figure 4A:
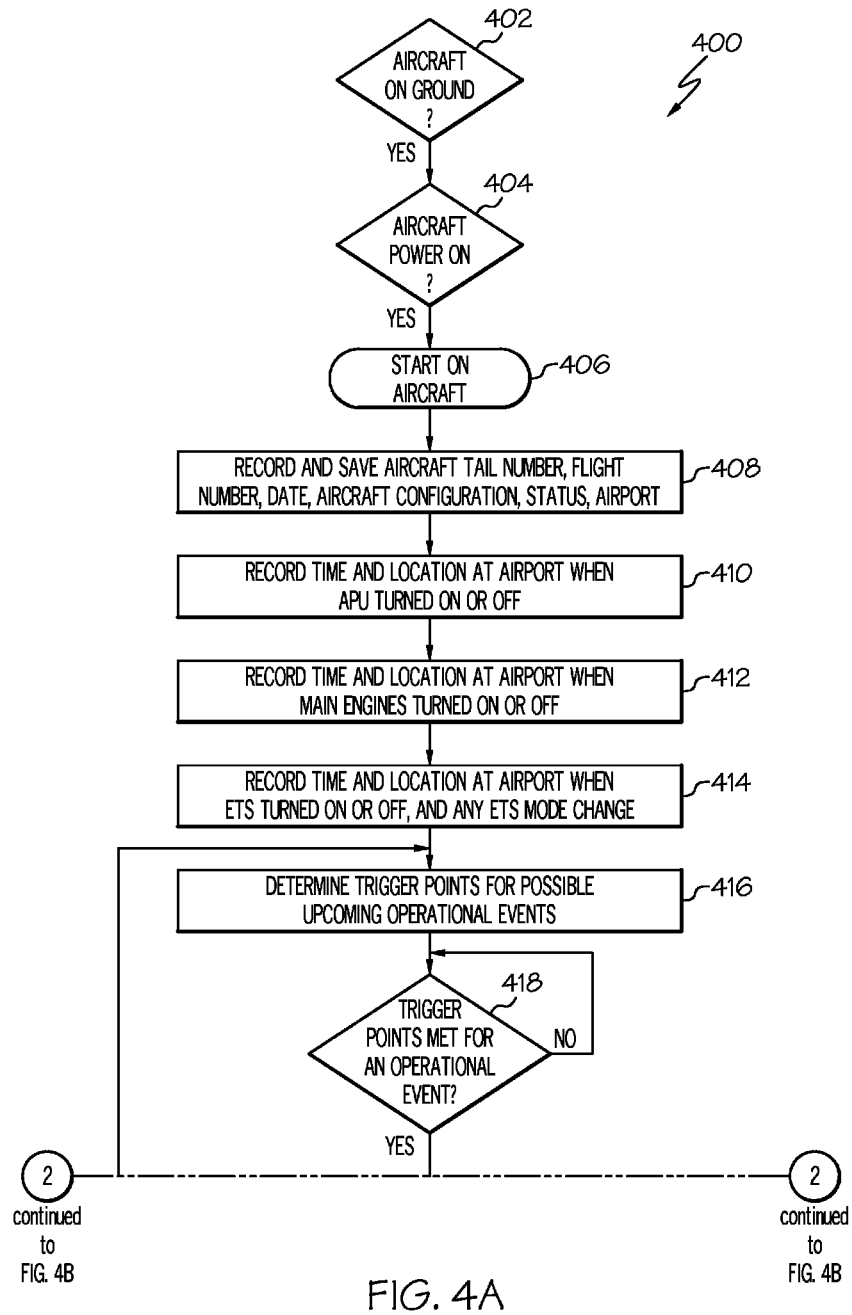
FIG. 4A is a flow chart of a first portion of a method of recording and transmitting taxi and performance data of an aircraft according to an exemplary embodiment of the present invention.

Referring now to FIG. 4A, a flow chart of a first portion of an exemplary embodiment of a method 400 of recording and transmitting taxi and performance data of an aircraft is illustrated. As in relation to FIGS. 2, 3A and 3B, the description refers to the first aircraft 104, although the steps of method 400 may be performed for any or all of the multiple aircraft 102. The electronic device 122 may determine if the first aircraft 104 is on the ground. The determination may be made in response to the location signal 266 or in response to an input to the pilot interface unit 228 made by the pilot or another person (step 402). If the first aircraft 104 is on the ground, the electronic device 122 may determine if the aircraft power is on (step 404). If the first aircraft 104 is on the ground and the aircraft power is on, the method 400 may start (step 406). These initial steps determine if the first aircraft 104 is taxiing or at the gate ready to taxi. Other alternative steps known in the art may alternatively be used.

The electronic device 122 may record and save the first aircraft 104 tail number, a flight number, a date, the first aircraft model, the first aircraft configuration, and/or an airport where the first aircraft 104 is located (step 408). The electronic device 122 may record the time and location of the first aircraft 104 whenever the APU 204 is turned on or off (step 410), in response to the APU status and/or power available signals 244, 246. In addition at appropriate intervals, such as for example every 10 seconds, APU electrical power parameters such as voltage and current being supplied to the ETS may be recorded.

The electronic device 122 may record the time and location of the first aircraft 104 whenever the main engines are turned on or off (step 412). The electronic device 122 may record the time and location of the first aircraft 104 whenever the ETS 202 is turned on or off, or when the ETS 202 has a mode change (step 414), in response to the ETS status signal 256. In addition at appropriate intervals, such as for example every 20 seconds, as well as when engines are turned on and off, fuel gauge system 208 readings may be recorded.

In some embodiments, it may be desirous to minimize the amount of information recorded by the electronic device 122 due to limitations or costs of memory device 126, removable memory device 132, processing power of the processor 124 or computer 146, and/or transmission time through wireless communication links 134. The electronic device 122 limit recording of some operating and performance parameters to times when an operational event is occurring. Different operating and performance parameters may be recorded during different operational events. The electronic device 122 may identify when operational events are occurring through trigger points. When all trigger points are met, it may indicate that an operational event is occurring. Some embodiments of the method 400 may include time limits on the recording of the operating and performance parameters.

The electronic device 122 may determine trigger points for possible upcoming operational events (step 416) and determine when all trigger points for an operational event have been met (step 418). Exemplary operational events and trigger points for those operational events will be further described in relation to FIGS. 5-8. The method 400 may continue to the steps illustrated in FIG. 4B.

Figure 4B:
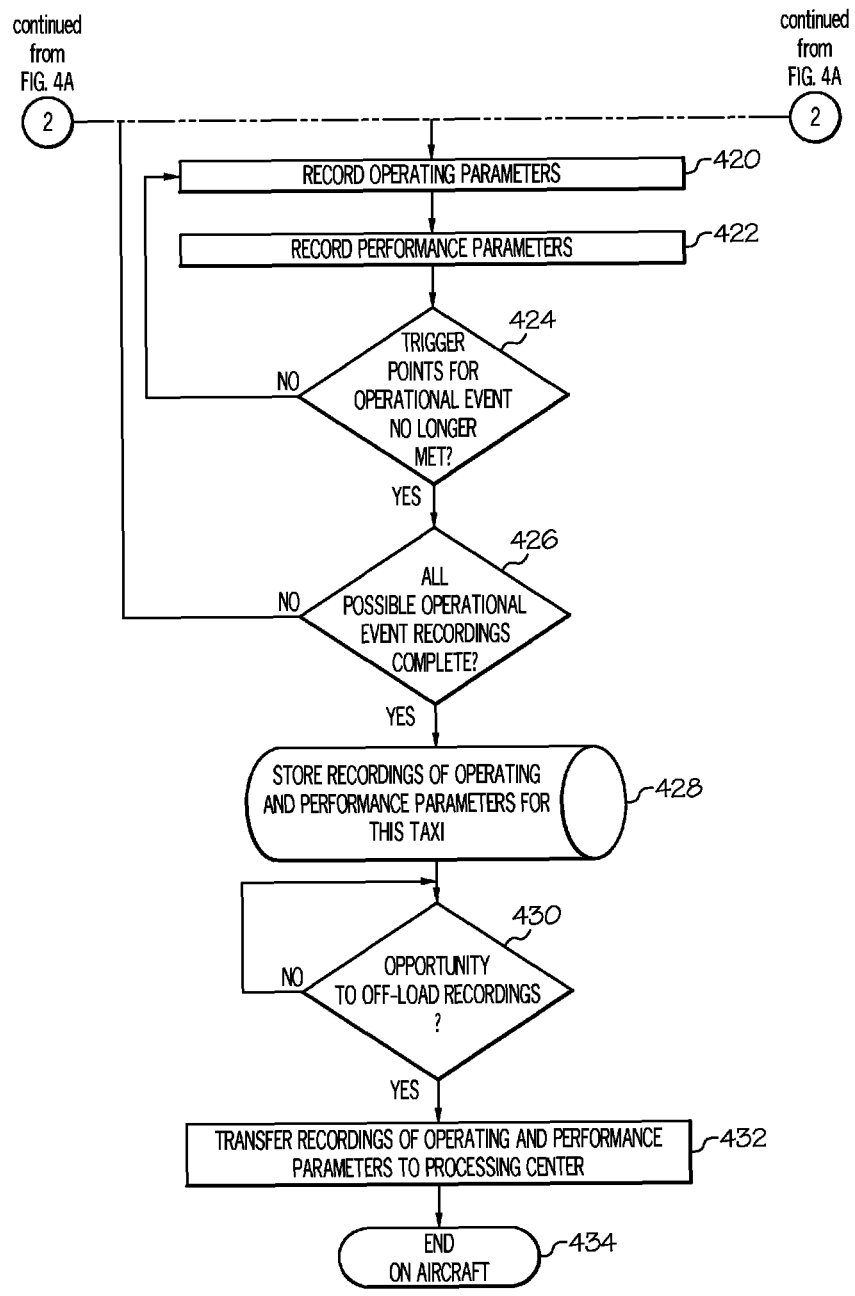
FIG. 4B is a flow chart of a second portion of a method of recording and transmitting taxi and performance data of an aircraft according to an exemplary embodiment of the present invention.

Referring now to FIG. 4B, a flow chart of a second portion of an exemplary embodiment of a method 400 of recording and transmitting taxi and performance data of an aircraft is illustrated. When all the trigger points for an operational event are met the electronic device may record operating parameters (step 420) and performance parameters (step 422) until all trigger points are no longer met (step 424). When all trigger points are no longer met, the electronic device 122 may determine if recordings of operating parameters and performance parameters have been completed for all possible operational events (step 426). If recordings of operating and performance parameters for all possible operation events have not been completed, the electronic device 122 may continue to determine if all the trigger points have been met for an operational event as long as the first aircraft 104 is still on the ground and the aircraft power is on.

If recordings of operating and performance parameters for all possible operation events have been made, and/or the first aircraft 104 is no longer on the ground with the aircraft power is on, the electronic device 122 may store all the recordings the operating and performance parameters for a taxi (step 428). The electronic device 122 may determine when there is an opportunity to transmit the recordings to the processing center 136 via communication links 134 (step 430) and when the opportunity is determined transfer the recordings to the processing center 136 (step 432). In an alternative embodiment, the electronic device 122 may save the recordings onto the removable memory device 132 for manual transfer to the processing center 136. The method 400 ends at step 434.

Figure 5:
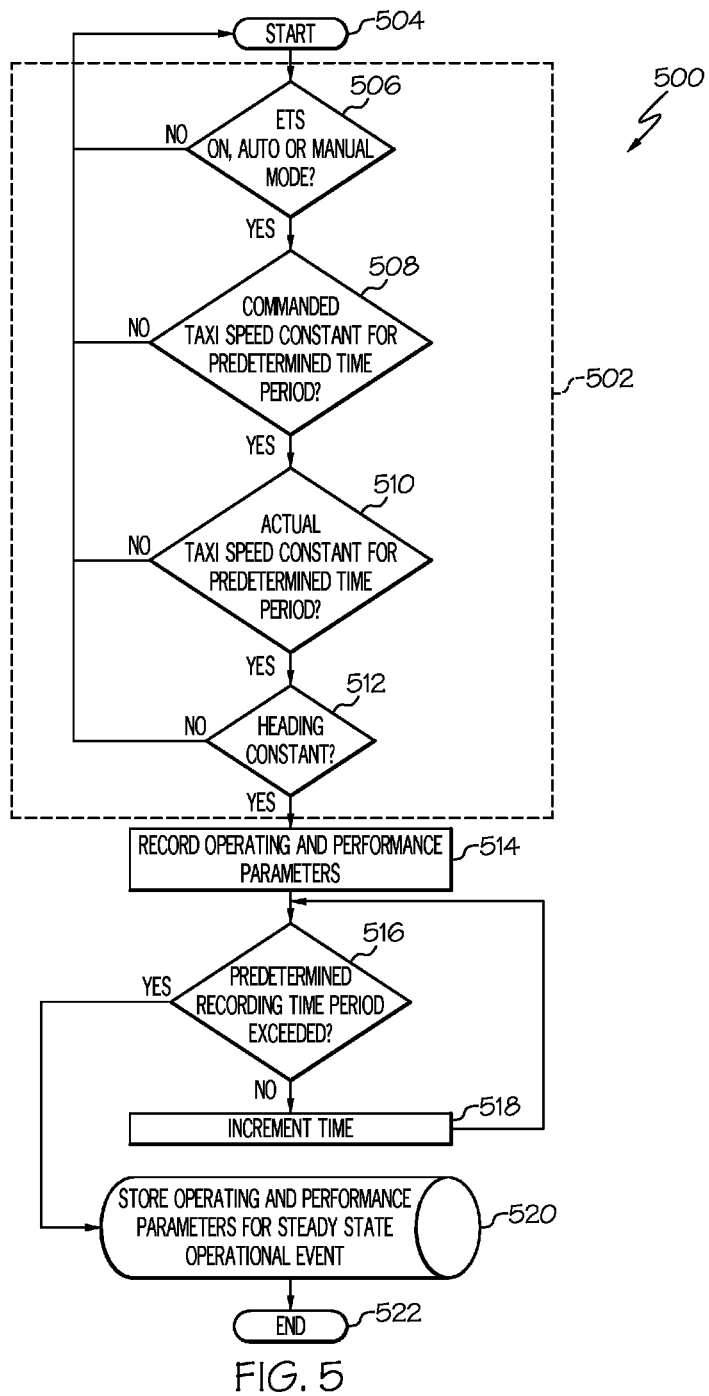
FIG. 5 is a flow chart of a method of recording operating and performance parameters of an aircraft during an ETS steady state operational event according to an exemplary embodiment of the present invention.

Referring now to FIG. 5, a flow chart of an exemplary method 500 of recording operating and performance parameters of an aircraft during an ETS steady state operational event is illustrated. The method 500 starts at step 504.

Steps 502 (within the dashed line box) may be trigger points. Each operational event may have trigger points associated with it. When all trigger points are met, the electronic device 122 may record operating and performance parameters for the operational event the trigger points are associated with. For example, when the electronic device 122 determines that all trigger points in steps 506-512 are met, the electronic device may record operating and performance parameters associated with the steady state operational event. Trigger points associated with the steady state operational event may include, but are not limited to the ETS 202 being on and in auto or manual mode (step 506); the commanded taxi speed being constant for a predetermined time period, for example thirty seconds (step 508); the actual taxi speed also being constant for a predetermined time period, for example thirty seconds (step 510); and the heading also being constant (step 512). The trigger points may be determined from one or more operating and performance parameter signals 288. When all trigger points are met and still being met, the electronic device 122 may record operating and performance parameters associated with the steady state operational event (step 514). The operating and performance parameters recorded may include, but are not limited to, those necessary to determine the speed the first aircraft 104 obtained, the electrical power the first aircraft 104 used to obtain the speed, and/or the fuel the first aircraft used during the steady state operational event. Alternatively, the electronic device 122 may determine from operating and performance parameter signals 288 the speed the first aircraft 104 obtained, the power the first aircraft 104 used to obtain the speed, and/or the fuel the first aircraft used during the steady state operational event; and record these determined performance parameters.

The electronic device 122 may only record operating and performance parameters for an operational event for a predetermined recording time period; and may cease recording the operating and performance parameters when the time the trigger points are all met exceeds the predetermined recording time period (step 516). The steady state operational event may, for example, have a predetermined recording time period of fifteen seconds. If the predetermined recording time period has not been exceeded, and/or unreasonable quantities of data which may overwhelm the storage capacity of the aircraft's computing systems have not been recorded, the electronic device 122 may increment a timer, check that trigger points have been met, and continue recording operating and performance parameters (step 518). If the predetermined recording time period has been exceeded, the electronic device 122 may store the operating and performance parameters for the steady state operational event (step 520), and the method 500 ends (step 522). Other approaches to recording the data as may be known to those knowledgeable in the art may also be used. For example, the controller 112 may record several samples of data in a revolving buffer in the processor and record the data only once the trigger points are met.

Figure 6:
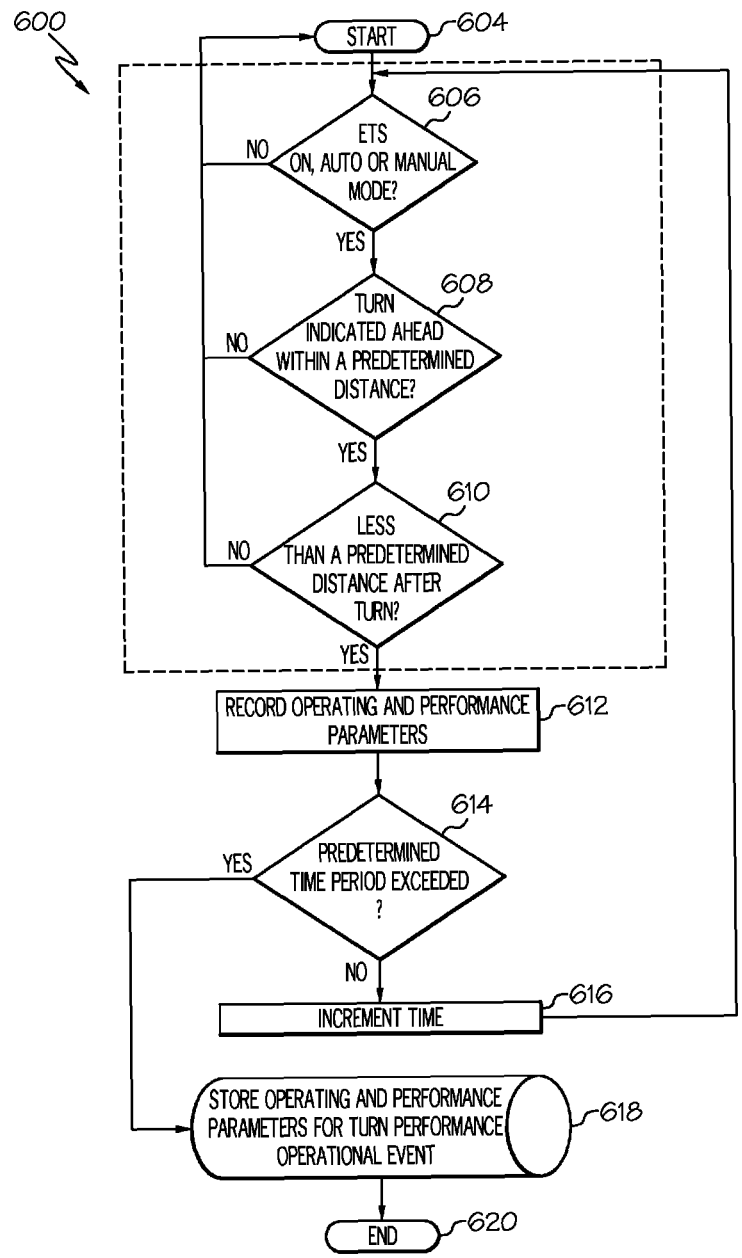
FIG. 6 is a flow chart of a method of recording operating and performance parameters of an aircraft during an ETS turn performance operational event according to an exemplary embodiment of the present invention.

Referring now to FIG. 6, a flow chart of an exemplary method 600 of recording operating and performance parameters of an aircraft during an ETS turn performance operational event is illustrated. The method 600 starts at step 604.

Steps 602 (within the dashed line box) may be the trigger points for the ETS turn performance operational event. If the electronic device 122 determines that all trigger points in steps 606-610 are met, the electronic device 122 may record operating and performance parameters associated with the ETS turn performance operational event. Trigger points associated with the ETS turn performance operational event may include, but are not limited to the ETS 202 being on and in auto or manual mode (step 606); the intended route of the first aircraft 104 including a turn within a predetermined distance, for example twenty feet (step 608); and the first aircraft being no more than a predetermined distance, for example twenty feet, from the completion of a turn (step 610). The trigger points may be determined from one or more operating and performance parameter signals 288. When all trigger points are met, the electronic device 122 may record operating and performance parameters associated with the ETS turn performance operational event (step 612). The recording of data may start once the trigger points at blocks 606 and 608 are met and the end when the predetermined distance of block 610 is met and/or exceeded. The operating and performance parameters recorded may include, but are not limited to, those necessary to determine the maximum nose wheel side load, for example the first aircraft speed and nosegear angle. Alternatively, the electronic device 122 may determine from operating and performance parameter signals 288 the maximum nose wheel side load during the ETS turn performance operational event; and record the determined maximum nose wheel side load.

The electronic device 122 may cease recording the operating and performance parameters for the ETS turn performance operational event when the trigger points are all met for a time exceeding the predetermined recording time period for the ETS turn performance operational event, which may be for example, two minutes (step 614). If the predetermined recording time period has not been exceeded, the electronic device 122 may increment a timer, check that trigger points have been met, and continue recording operating and performance parameters (step 616). If the predetermined recording time period has been exceeded, the electronic device 122 may store the operating and performance parameters for the ETS turn performance operational event (step 618), and the method 600 ends (step 620).

Figure 7:
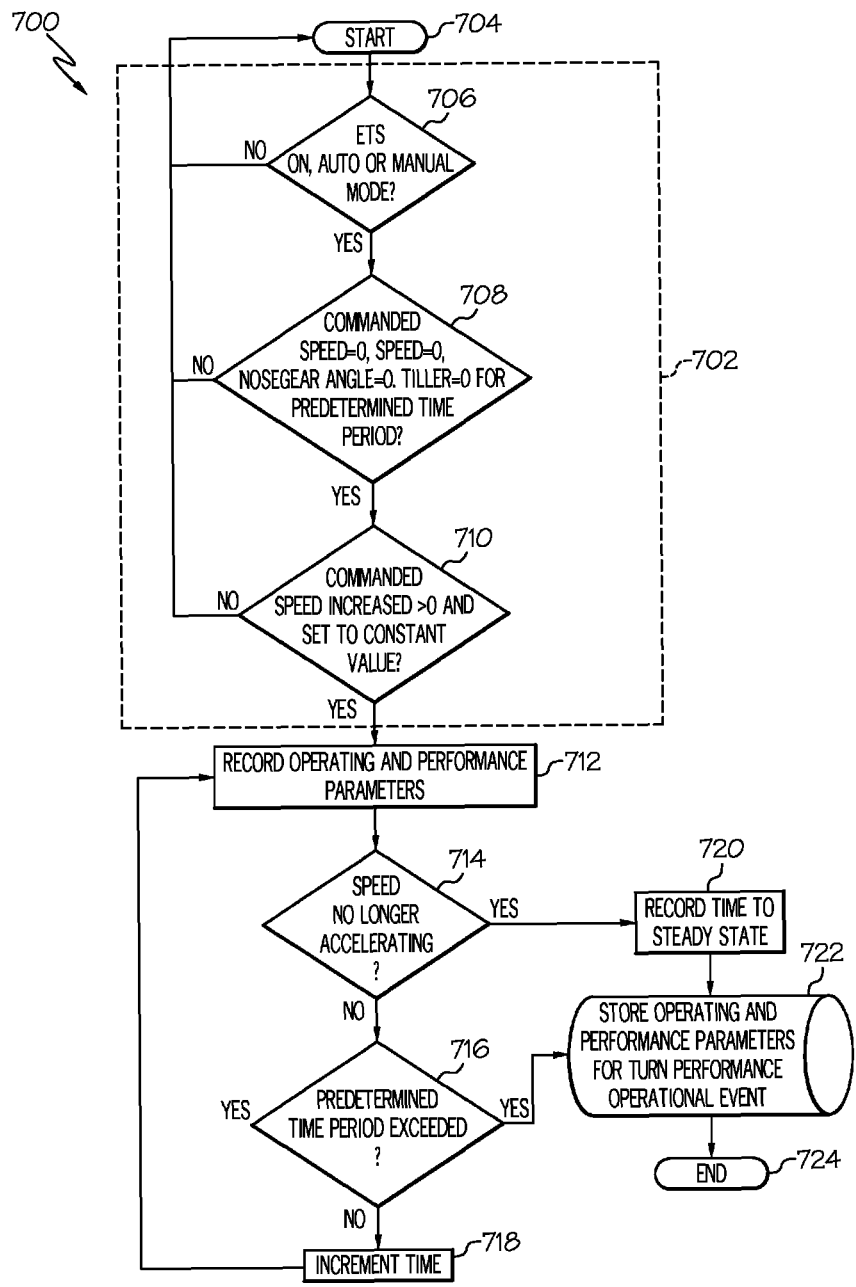
FIG. 7 is a flow chart of a method of recording operating and performance parameters of an aircraft during an ETS acceleration performance operational event according to an exemplary embodiment of the present invention.

Referring now to FIG. 7, a flow chart of an exemplary method 700 of recording operating and performance parameters of an aircraft during an ETS acceleration performance operational event is illustrated. The method 700 starts at step 704.

Steps 702 (within the dashed line box) may be the trigger points for the ETS acceleration performance operational event. If the electronic device 122 determines that all trigger points in steps 706-710 are met, the electronic device 122 may record operating and performance parameters associated with the ETS acceleration operational event. Trigger points associated with the ETS acceleration performance operational event may include, but are not limited to the ETS 202 being on and in auto or manual mode (step 706); the commanded speed being zero, the first aircraft 104 speed being zero, the nosegear angle being zero, and the tiller being zero for a predetermined time period, for example five seconds (step 708); and the commanded speed being increased to a greater than zero value and set to a constant value (step 710). The trigger points may be determined from one or more operating and performance parameter signals 288. When all trigger points are met, the electronic device 122 may record operating and performance parameters associated with the ETS acceleration operational event (step 712). The operating and performance parameters recorded may include, but are not limited to, those necessary to determine the time for the first aircraft 104 to get to the commanded speed, the power the first aircraft 104 used to obtain the commanded speed, and/or the fuel the first aircraft used during the ETS acceleration operational event. Alternatively, the electronic device 122 may determine from operating and performance parameter signals 288 time for the first aircraft 104 to get to the commanded speed, the power the first aircraft 104 used to obtain the commanded speed, and/or the fuel the first aircraft used during the ETS acceleration operational event; and record the determined performance parameters.

The electronic device 122 may cease recording the operating and performance parameters for the ETS acceleration operational event when the first aircraft 104 speed is no longer accelerating (step 714) or the trigger points are all met for a time exceeding the predetermined recording time period for the ETS acceleration operational event, which may be for example, thirty seconds (step 716). If the predetermined recording time period has not been exceeded, the electronic device 122 may increment a timer, check that trigger points have been met, and continue recording operating and performance parameters (step 718). If the predetermined recording time period has been exceeded, the electronic device 122 may record the time it took for the first aircraft 104 to reach steady state speed at the commanded speed (step 720) and store the operating and performance parameters for the ETS acceleration operational event (step 722). The method 700 may then end (step 724).

Figure 8:
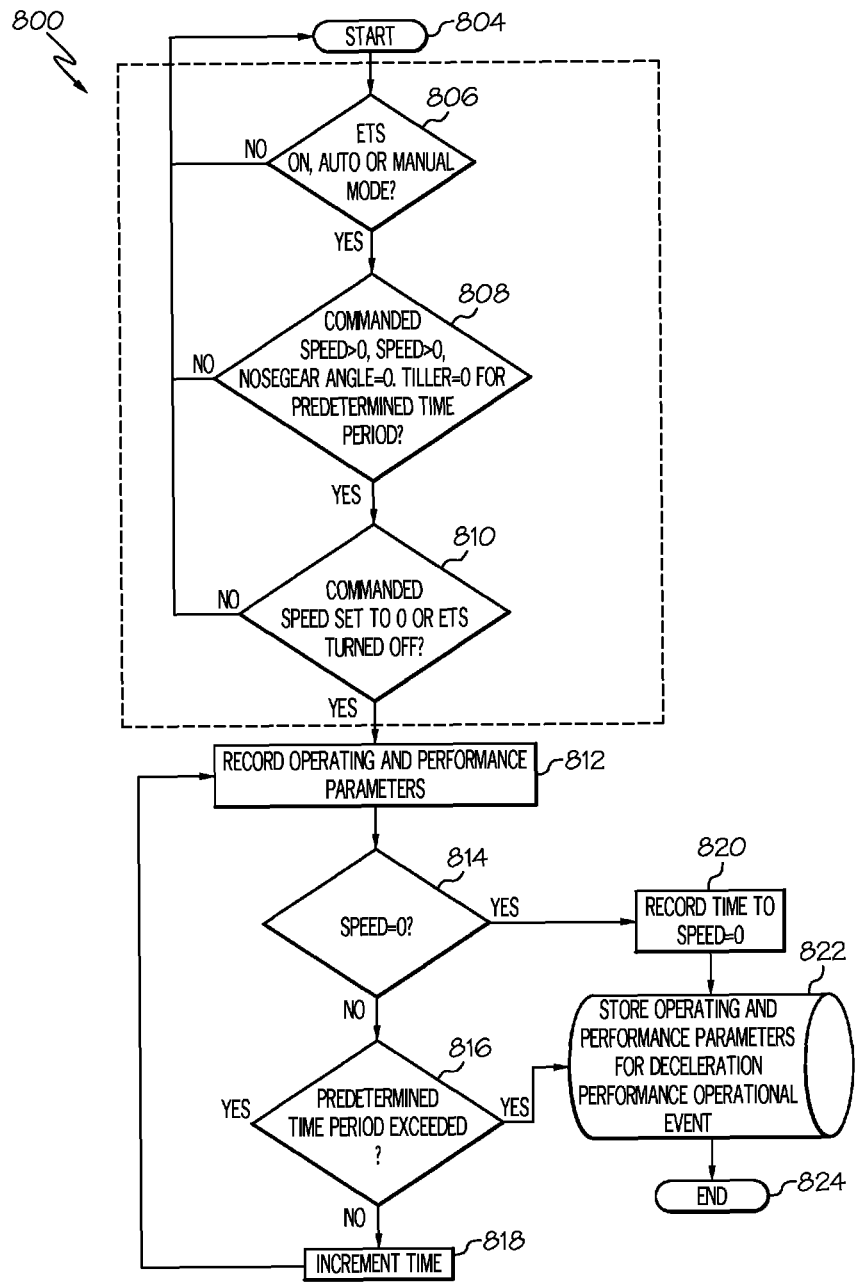
FIG. 8 is a flow chart of a method of recording operating and performance parameters of an aircraft during an ETS deceleration performance operational event according to an exemplary embodiment of the present invention.

Referring now to FIG. 8, a flow chart of an exemplary method 800 of recording operating and performance parameters of an aircraft during an ETS deceleration performance operational event is illustrated. The method 800 starts at step 804.

Steps 802 (within the dashed line box) may be the trigger points for the ETS deceleration performance operational event. If the electronic device 122 determines that all trigger points in steps 806-810 are met, the electronic device 122 may record operating and performance parameters associated with the ETS deceleration operational event. Trigger points associated with the ETS deceleration performance operational event may include, but are not limited to the ETS 202 being on and in auto or manual mode (step 806); the commanded speed being greater than zero, the first aircraft 104 speed being greater than zero, the nosegear angle being zero, and the tiller being zero for a predetermined time period, for example five seconds (step 808); and the commanded speed being set to a zero value or the ETS 202 being turned off (step 810). The trigger points may be determined from one or more operating and performance parameter signals 288. When all trigger points are met, the electronic device 122 may record operating and performance parameters associated with the ETS deceleration operational event (step 812). The operating and performance parameters recorded may include, but are not limited to, those necessary to determine the time for the first aircraft 104 to slow to a zero speed. Alternatively, the electronic device 122 may determine from operating and performance parameter signals 288 time for the first aircraft 104 to slow to a zero speed, and record the time for the first aircraft 104 to slow to a zero speed.

The electronic device 122 may cease recording the operating and performance parameters for the ETS deceleration operational event when the first aircraft 104 speed has slowed to zero (step 814) or the trigger points are all met for a time exceeding the predetermined recording time period for the ETS deceleration operational event, which may be for example, forty-five seconds (step 816). If the predetermined recording time period has not been exceeded, the electronic device 122 may increment a timer, check that trigger points have been met, and continue recording operating and performance parameters (step 818). If the first aircraft 104 decelerates to a zero speed before the predetermined time period is exceeded the electronic device 122 may record the time it took for the first aircraft 104 to decelerate to zero speed (step 820). If the predetermined recording time period is been exceeded before the first aircraft 104 decelerates to a zero speed, the electronic device 122 may record this. The electronic device may store the operating and performance parameters for the ETS deceleration operational event (step 822). The method 800 may then end (step 824).

Figure 9A:
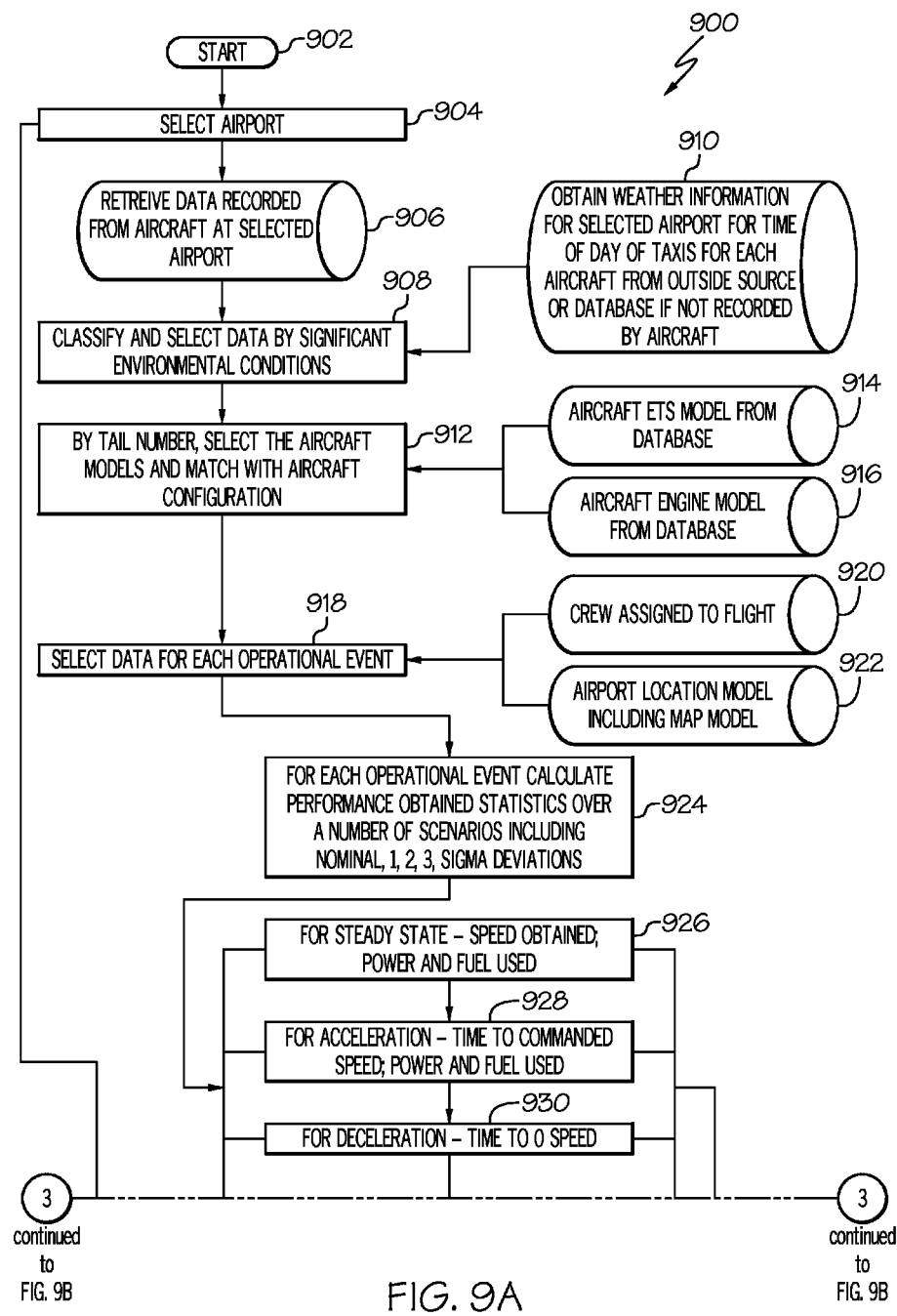
FIG. 9A is a flow chart of a first portion of a fault detection and operational evaluation method for diagnostic and prognostics of aircraft with ETS according to an exemplary embodiment of the present invention.

Referring now to FIG. 9A, a flow chart of a first portion of a fault detection and operational evaluation method 900 for diagnostic and prognostics for aircraft with ETS is illustrated. The method 900 may be performed by the computer 146 at the processing center 136 on a periodic basis to provide prognostic and operational reports for any of the multiple aircraft 102, crews or crew members assigned to any of the multiple aircraft 102, groups of the multiple aircraft (for example, but not limited to, airline fleets, and/or aircraft models or configurations), airports, any combination of these grouping categories, and/or other groupings which would be desirous to report on. As more data on taxi operations of the multiple aircraft 102 is collected, the statistical models as described below may become more accurate. If more data for a certain category of analysis would be desirous for a more desirous statistical model, computer performance models may be used to account for differences (such as, but not limited to, weight, component differences, and environmental conditions during taxis) between aircraft information being compared. The method 900 starts at step 904.

Taxi data and correlating aircraft tail number (or other aircraft model and configuration identifying information), airport, date, time, location at airport, environmental conditions, and/or other information needed to categorize and report on the taxi data; from any or all of the multiple aircraft 102; may have been transmitted to and stored by the computer 146, as described above or by similar methods. The computer 146 may select an airport and retrieve taxi data for taxis at that airport (step 906).

The computer 146 may classify taxi data in response to significant environmental conditions (step 908). The environmental conditions relating to the taxi data may have been entered into the pilot interface unit 228 or otherwise recorded by the electronic device 122 and transmitted to the computer 146. However, correlating environment conditions may not have been recorded by the electronic device 122 for other taxi data and transmitted to the computer 146. The computer 146 may obtain weather information for the airport for the time and date of taxi data from an outside database to establish environmental conditions correlating to the taxi data (step 910).

The computer 146 may further classify the taxi data by the aircraft model and/or configuration, of the ETS 202 and main engines for example, in response to aircraft identification information correlating to the taxi data (step 912).

Some taxi data may not include correlating aircraft model and configuration data, and the computer 146 may obtain the correlating aircraft model and configuration from the aircraft database 160 or another outside data source 160 in response to the aircraft identification information transmitted, for example, the aircraft tail number (steps 914 and 916).

The computer 146 may further classify the taxi data by operational events. The computer 146 may obtain crew assignments correlating to the taxi data from outside data sources 162, such as airline databases, in response to the aircraft identification information correlating to the taxi data (step 920). The computer 146 may obtain geographical data correlating to the taxi data, such as, for example, the grade of the surface the aircraft was traveling on from outside data sources 162, such as map databases, in response to the taxi data location correlating to the taxi data. Alternatively the computer 146 may obtain the geographic information from the airport database 158 (step 922).

The computer 146 may calculate performance obtained statistics for each operational event from a number of recordings from any or all of the multiple aircraft 102, of the aircraft model, at the airport, during an environmental condition. The performance obtained statistics may include nominal, 1, 2, and 3 sigma deviations, means, and/or medians (step 924). The performance parameters the statistics are calculated for may be predetermined, and may vary with the operational event. For example, for the ETS steady state operational event performance obtained statistics may include calculated for speed the aircraft obtained, power used to obtain the speed, and fuel used to obtain the speed (step 926). For the ETS acceleration operational event performance obtained statistics may include time to commanded speed, power used to obtain the speed, and fuel used to obtain the speed (step 928). For the ETS deceleration operational event performance obtained statistics may include time to a zero speed (step 930). The method 900 may continue to the steps illustrated in FIG. 9B.

Figure 9B:
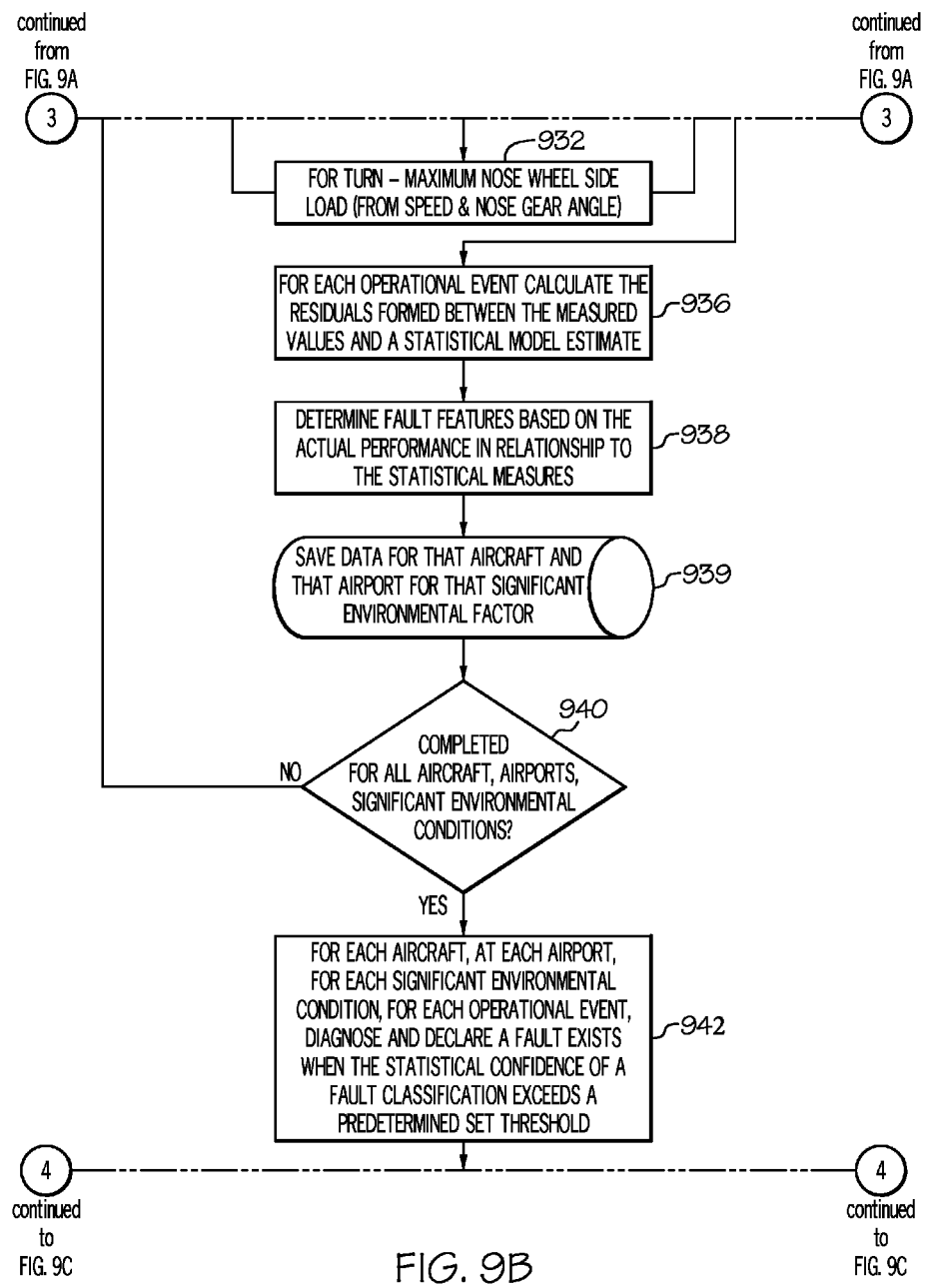
FIG. 9B is a flow chart of a second portion of a fault detection and operational evaluation method for diagnostic and prognostics of aircraft with ETS according to an exemplary embodiment of the present invention.

Referring now to FIG. 9B, a flow chart of a second portion of a fault detection and operational evaluation method 900 for diagnostic and prognostics for aircraft with ETS is illustrated. For the ETS turn performance operational event performance obtained statistics may include maximum nosegear side load (step 932).

The computer 146 may use the ETS computer performance model 152, the aircraft performance model 154, the engine computer performance model 156, or any other computer performance model to estimate the performance parameters considered in the statistical model for each operational event for each of the multiple aircraft 102 (step 934). The estimated performance parameters may be compared with the actual performance factors and the difference stored. If the difference is greater than a predetermined percentage, the aircraft may be flagged for reporting. In cases where data from enough instances of the operational event has not been received by the computer 146 for a specific aircraft model or configuration, airport, and/or environmental condition, to form a large enough data set for a meaningful or desired statistical model, the ETS computer performance model 152, the aircraft performance model 154, the engine computer performance model 156, or any other computer performance model may be used to account for differences in weight, speed, commanded speed or other factors.

The computer 146 may calculate a one or more theoretical statistical models from the taxi data for any or all of the operational events. The computer 146 may compare the performance parameters for an operational event of each of the multiple aircraft 102 for an operational event with the one or more statistical models, and calculate a figure of merit which may include the percentage difference between the actual performance factors and each of the one or more statistical models. The one or more statistical models may include statistical means, medians, variance and/or standard deviation. The computer 146 may calculate residuals for each operational event between the measured values and the model estimate (step 936). The computer may determine potential faults and/or faults based at least in part on the relationship of the recorded parameters to the statistical measures (step 938). The computer 146 may store the data for each of the multiple aircraft 102, the airport, and the environmental factor (step 939). The computer 146 may check if the methods steps 904-938 have been completed for all aircraft, all airports, and all significant environmental conditions, and if not, the computer 146 may continue doing to perform steps 904-939. If steps 904-939 have been completed for all aircraft, all airports, and all significant environmental conditions (step 940), the computer 146 may compare each performance parameter, for each operational event, for each aircraft, at each airport, for each significant environmental condition, with the one or more statistical models for the operational event. If any one of the multiple aircrafts 102 exceeds an acceptable difference with any of the one or more statistical models, on any performance parameter, at any airport, during any significant environmental condition, the computer 146 may flag that aircraft as having a potential fault. If the statistical confidence of the potential fault exceeds a predetermined threshold, the computer 146 may diagnose a fault. (step 942). The method 900 may continue to the steps illustrated in FIG. 9C.

Figure 9C:
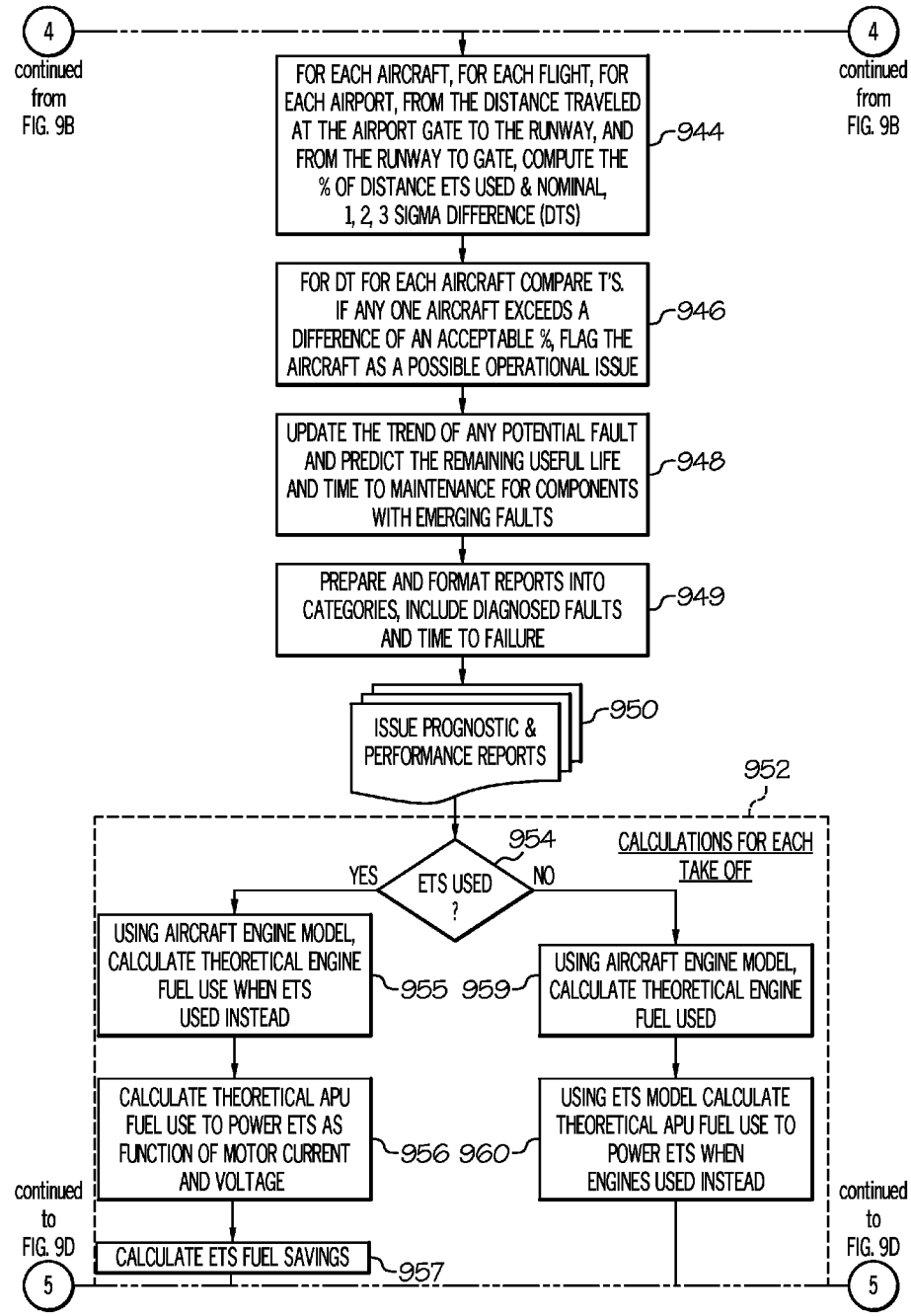
FIG. 9C is a flow chart of a third portion of a fault detection and operational evaluation method for diagnostic and prognostics of aircraft with ETS according to an exemplary embodiment of the present invention.

Referring now to FIG. 9C, a flow chart of a third portion of a fault detection and operational evaluation method 900 for diagnostic and prognostics for aircraft with ETS is illustrated. The computer 146 may calculate for each of the multiple aircraft 102, for each flight, for each airport, the percent of the distance traveled during taxis from the gate to the runway, and/or the runway to the gate, that the ETS 202 was on. The computer 146 may calculate the percent of the distances the ETS 202 was on in response to recorded operating parameters. From the percent of the distances the ETS 202 was on, in all of the multiple aircraft 102 that the computer 146 has transmitted taxi data from, the computer 146 may calculate one or more statistical models, including nominal, 1, 2, and 3 sigma differences (step 944). The computer 146 may compare the percent of distances any one of the multiple aircraft 102 may have used ETS 202 for taxis with the one or more statistical models. If any of the differences between the percent of distances (Dt) any one of the multiple aircraft 102 may have used ETS 202 for taxis, and any of the one or more statistical models exceeds a predetermined acceptable value, the computer 146 may flag the specific one of the multiple aircraft 102 as having a possible operational issue (step 946).

The computer 146 may predict the remaining useful life and/or time to maintenance for systems and/or components of any of the multiple aircraft 102 based on trending the potential faults and/or faults (step 948).

The computer 146 may generate prognostic and operational reports 138 in different categories relating to the performance parameters during operational events and use of the ETS 202 during taxis on the multiple aircraft 102. The reports 138 may be categorized by aircraft, aircraft model, ETS 202 configuration, crew members, airport, airline fleet, environmental condition, and/or other desired categories.

The reports 138 may flag prognostic or operational issues (step 949). The method 900 may continue to the steps illustrated in FIG. 9C.

Referring now to FIG. 9C, a flow chart of a third portion of a fault detection and operational evaluation method 900 for diagnostic and prognostics for aircraft with ETS is illustrated. The third portion of method 900, and fourth portion of method 900 (see FIG. 9D) may include calculations for each taxi from the gate to the runway for takeoff, of each of the multiple aircraft 102 that the computer 146 may receive taxi data from. These steps (954-961) are enclosed by the dashed line bordered box 952, and will be described below in relation to one taxi from the gate to the runway for takeoff by the first aircraft 104. But, it should be understood that the same steps may be performed for each taxi from the gate to the runway for takeoff by each of the multiple aircraft 102.

From taxi data transmitted from the first aircraft 104, the computer 146 may determine any ETS taxi portions of a taxi from the gate to the runway for takeoff, where the ETS 202 was used to provide motive power for the first aircraft 104; and engine portions of the same taxi where the main engines were used to provide motive power for the first aircraft 104 (step 954). The computer 146 may perform steps 955-958 for the ETS taxi portions; and perform steps 959-961, and 958 for the engine taxi portions.

The computer 146 may calculate a theoretical engine fuel use for the ETS taxi portions. The theoretical engine fuel use may be an estimate of the fuel the main engines would have used if the main engines had been used for motive power instead of the ETS 202 during the ETS taxi portion. The computer 146 may use the aircraft computer performance model 154, and the engine computer performance model 156, along with recorded operating parameters to estimate the theoretical engine fuel use (step 955).

The computer 146 may calculate a theoretical APU fuel use for the ETS taxi portions. The theoretical APU fuel use may be an estimate of the fuel the APU used to power the ETS 202 during the ETS taxi portion. The computer 146 may use the ETS computer performance model 152, and the aircraft computer performance model 154, along with recorded operating parameters, such as for example the motor current and the motor voltage, to estimate the theoretical APU fuel use (step 956).

The computer 146 may compare the theoretical engine fuel use to the theoretical APU fuel use and calculate estimated fuel savings as a result of the first aircraft 104 using ETS 202 for the ETS taxi portions (step 957). The method 900 may continue to the steps illustrated in FIG. 9D.

Figure 9D:
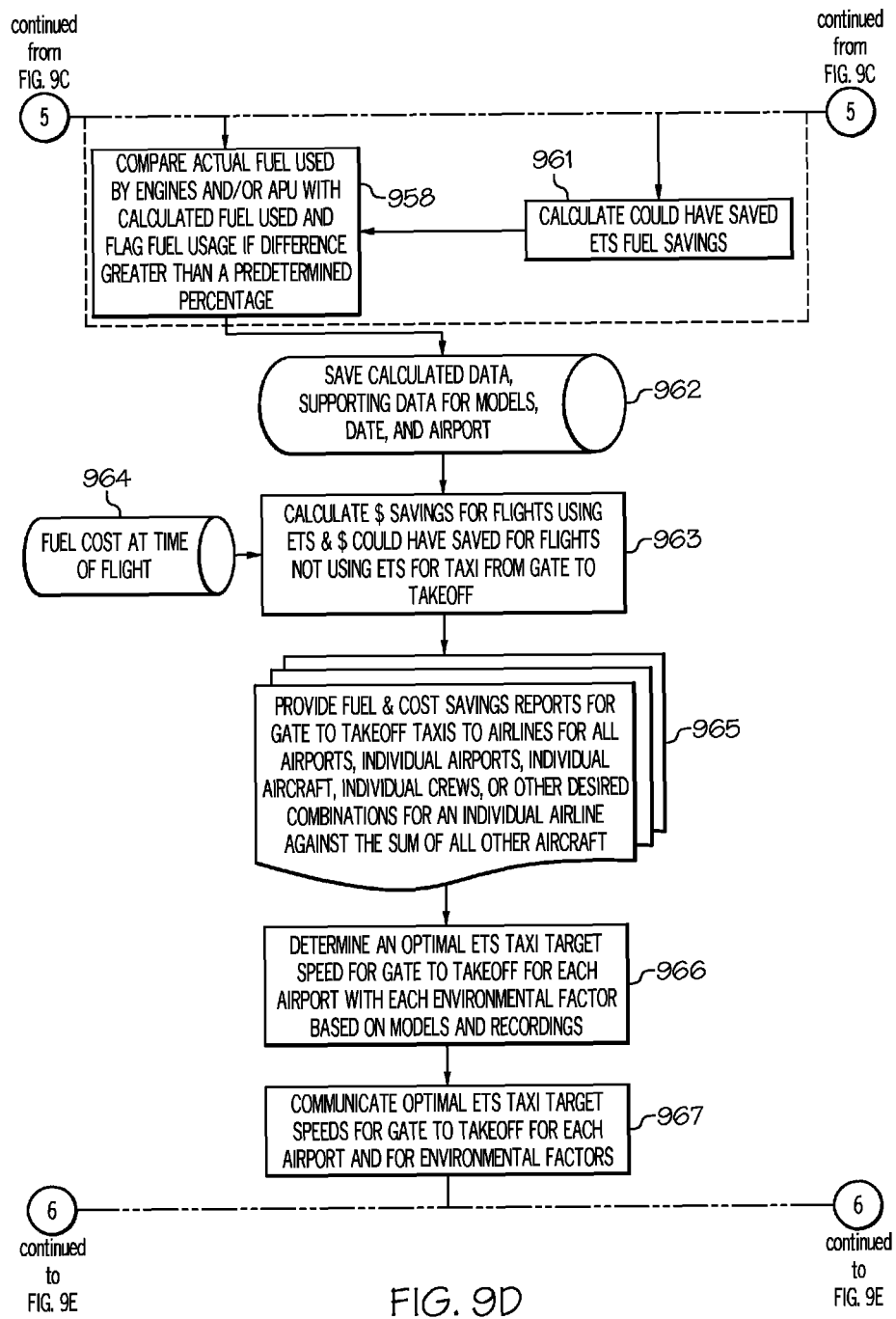
FIG. 9D is a flow chart of a fourth portion of fault detection and operational evaluation method for diagnostic and prognostics of aircraft with ETS according to an exemplary embodiment of the present invention.

Referring now to FIG. 9D, a flow chart of a fourth portion of a fault detection and operational evaluation method 900 for diagnostic and prognostics for aircraft with ETS is illustrated. If the first aircraft 104 had a fuel gauge system 208, and the taxi data included the fuel levels or other operating parameters indicative of fuel use, the computer 146 may estimate an actual fuel used during the ETS taxi portion in response the operating parameters. The computer 146 may compare the actual fuel use to the theoretical APU fuel use and flag the taxi if the difference is greater than a predetermined value or percentage (step 958).

Referring back to FIG. 9C, the computer 146 may calculate a theoretical engine fuel use for the engine taxi portions. The theoretical engine fuel use may be an estimate of the fuel the main engines used to during the engine taxi portion. The computer 146 may use the aircraft computer performance model 154, and the engine computer performance model 156, along with recorded operating parameters to estimate the theoretical engine fuel use (step 959).

The computer 146 may calculate a theoretical APU fuel use for the ETS taxi portions. The theoretical APU fuel use may be an estimate of the fuel the APU would have used to power the ETS 202 if the ETS 202 had been used for motive power instead of the main engines during the engine taxi portion. The computer 146 may use the ETS computer performance model 152, and the aircraft computer performance model 154, along with recorded operating parameters, to estimate the theoretical APU fuel use (step 960).

Referring now to FIG. 9D, the computer 146 may compare the theoretical engine fuel use to the theoretical APU fuel use and calculate estimated could have saved fuel if the first aircraft 104 had used the ETS 202 for the engine taxi portions (step 961). If the first aircraft 104 had a fuel gauge system 208, and the taxi data included the fuel levels or other operating parameters indicative of fuel use, the computer 146 may estimate an actual fuel used during the engine taxi portion in response the operating parameters. The computer 146 may compare the actual fuel use to the theoretical engine fuel use and flag the taxi if the difference is greater than a predetermined value or percentage (step 958).

The computer 146 may save all the calculated data, and supporting date from the calculations for each takeoff 952 for all the multiple aircraft 102 (step 962). For each taxi, the computer 146 may calculate the financial fuel savings and/or financial could have saved fuel savings, from the calculated fuel savings and calculated could have saved fuel savings and information on fuel costs at the time of flights, which the computer 146 may obtain from outside data sources 162 (steps 963, 964).

The computer 146 may generate fuel and cost savings reports 138 in different categories relating to the calculations in steps 954-963. The reports 138 may be categorized by aircraft, aircraft model, ETS 202 configuration, crew members, airport, airline fleet, environmental condition, and/or other desired categories. The reports 138 may flag any fuel use issues (step 958).

The computer 146 may determine one or more optimal ETS taxi target speeds for taxis from the gate to takeoff. The ETS target taxi speeds may be by aircraft model, aircraft configuration, airport, portions of airport runways and taxi paths, environmental conditions, or any other desirous category. The ETS target taxi speeds may be in response to the calculated theoretical fuel use values, the actual fuel use, and other operating or performance parameters (step 966) The one or more ETS taxi target speeds may be communicated to aircrafts, airlines, airports, or other interested parties (step 967). The method 900 may continue to the steps illustrated in FIG. 9E.

Figure 9E:
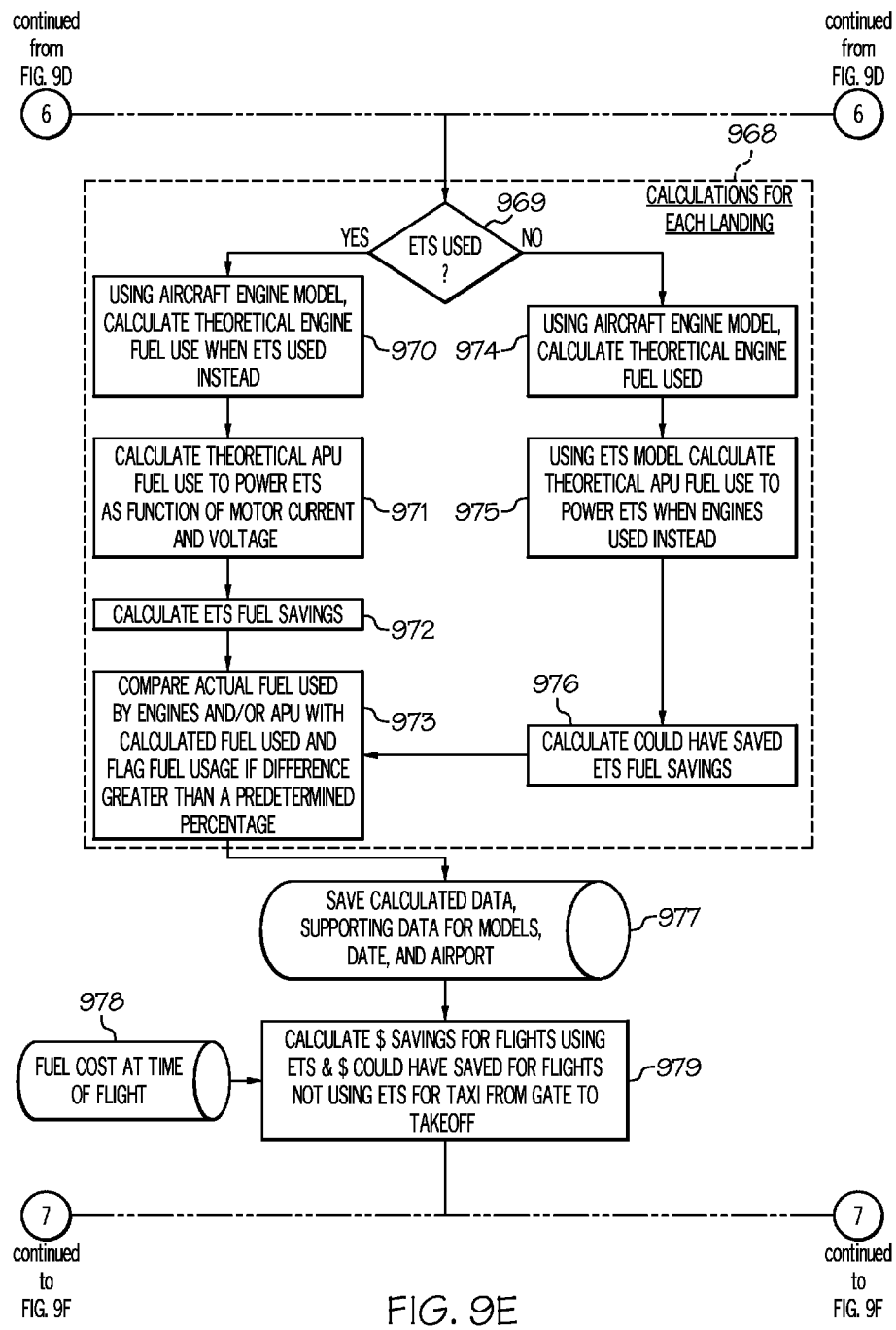
FIG. 9E is a flow chart of a fifth portion of a fault detection and operational evaluation method for diagnostic and prognostics of aircraft with ETS according to an exemplary embodiment of the present invention.
Figure 9F:
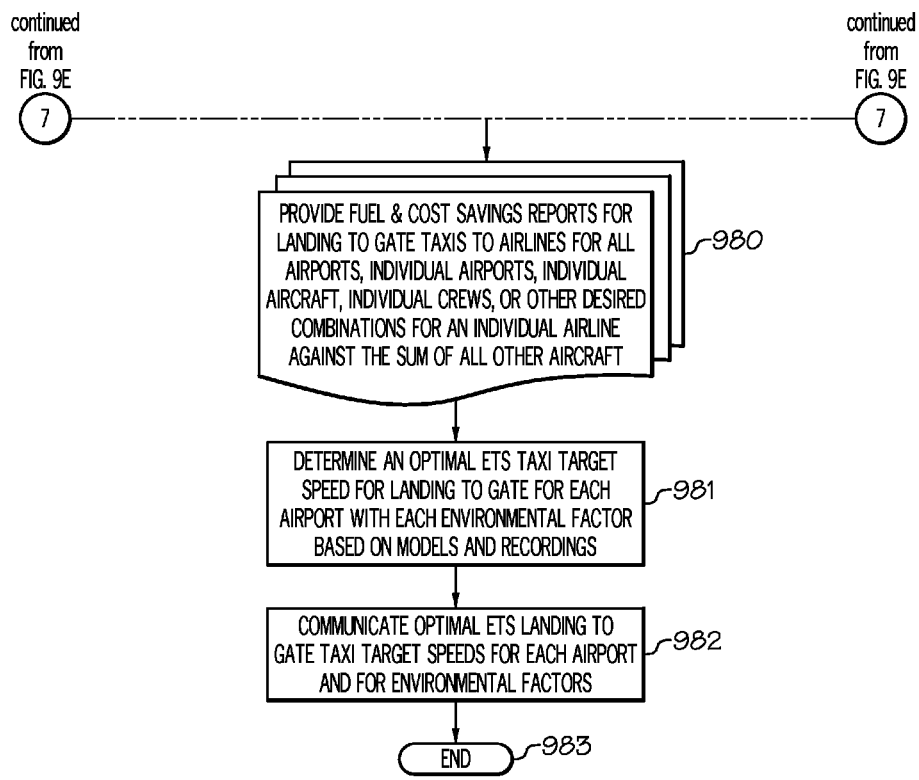
FIG. 9F is a flow chart of a sixth portion of a fault detection and operational evaluation method for diagnostic and prognostics of aircraft with ETS according to an exemplary embodiment of the present invention.

Referring now to FIG. 9E, a flow chart of a fifth portion of a fault detection and operational evaluation method 900 for diagnostic and prognostics for aircraft with ETS is illustrated. The fifth portion of method 900, and the sixth portion of method 900 (see FIG. 9F) may include calculations for each taxi from landing to the gate, of each of the multiple aircraft 102 that the computer 146 may receive taxi data from. These steps (969-976) are enclosed by the dashed line bordered box 968, and are similar to steps 954-961 in FIGS. 9C and 9D, except they are for landing to the gate taxis instead of gate to runway taxis. They will therefore not be further described. Steps 977-982 are similar to steps 962-967 in FIG. 9D, except they are for landing to the gate taxis instead of gate to runway taxis. They will therefore not be further described. Method 900 ends at step 983. The information as described above for FIGS. 9C-9F may be used to not only suggest optimum speeds for using ETS during taxis at various airports, but may also suggest whether using ETS at certain airports may produce savings, and thus ETS use at those airports would not be recommended.

It should be understood, of course, that the foregoing relates to exemplary embodiments of the invention and that modifications may be made without departing from the spirit and scope of the invention as set forth in the following claims.

We claim:

1. A diagnostics and prognostics evaluation method for aircraft electric taxi systems (ETS), comprising:
   receiving, with a computer, an electronically recorded first performance parameter of a first ETS of a first aircraft during a taxi operational event of the first aircraft at an airport;
   receiving, with the computer, electronically recorded first comparative performance parameters corresponding to the first performance parameter from electric taxi systems of multiple aircraft during corresponding taxi operational events of the multiple aircraft at the airport;
   generating, with the computer, a first performance factor statistical model in response to the first performance parameter and the first comparative performance parameters;
   comparing the first performance parameter of the first aircraft with the first performance factor statistical model; and
   calculating a first performance parameter difference based on the comparison;
   generating a first aircraft electric taxi system maintenance problem report when the first performance parameter difference exceeds a predetermined acceptable first performance parameter difference value;
   wherein the taxi operational event of the first aircraft and the corresponding taxi operational event of the multiple aircraft include an ETS operation at a steady state speed;
   wherein the first performance parameter includes one of a speed obtained during ETS operation at steady state speed and power used by the APU to power the ETS during the ETS operation at steady state speed, or fuel used by the APU to power the ETS during the ETS operation at steady state speed;
   receiving, with the computer, electronically recorded taxi data and aircraft identification information from the first aircraft with an electric taxi system, the taxi data including position of the first aircraft and corresponding auxiliary power unit status, electric taxi system status, and aircraft speed for each takeoff of the first aircraft and each landing of the first aircraft for a predetermined fuel reporting time period;
   determining, with the computer, electric taxi system use time periods during all first aircraft taxis to takeoff or first aircraft taxis after landing for the predetermined fuel reporting time period during which motive power was supplied to the first aircraft from the electric taxi system, in response to the taxi data;
   determining, with the computer, an electric taxi system configuration, an aircraft configuration, and a main engine configuration of the first aircraft in response to the aircraft identification information;
   estimating, with a computer electric taxi system performance model or in response to a fuel level signal, an amount of fuel used by an APU (auxiliary power unit) of the first aircraft to power the ETS system during each electric taxi system use time period in response to the taxi data and the electric taxi system configuration;
   estimating, with a computer aircraft performance model, an amount of fuel which would have been used by the main engines of the first aircraft during each electric taxi system use time period if main engines of the first aircraft had supplied motive power to the first aircraft, in response to the taxi data, aircraft configuration, and main engine configuration;
   calculating with the computer, a first aircraft amount of fuel saved based on the amount of fuel used by the APU and the amount of fuel which would have been used by the main engines for at least one first aircraft takeoff or first aircraft landing during the fuel reporting period;
   determining, with the computer, main engine use reporting time periods during all first aircraft taxis to takeoff or first aircraft taxis after landing for the predetermined fuel reporting time period during which motive power was supplied to the first aircraft from the main engines, in response to the taxi data;
   estimating, with the computer aircraft performance model or in response to a fuel level signal, an amount of fuel used by the first aircraft during each main engine use reporting time period in response to the taxi data, the aircraft configuration, and the main engine configuration;
   estimating, with the computer electric taxi system performance model, an amount of fuel which would have been used by the first aircraft during each main engine use reporting time period if the ETS system of the first aircraft had supplied motive power to the first aircraft, in response to the taxi data and the electric taxi system configuration; and
   calculating with the computer, a first aircraft amount of fuel which would have been saved based on the amount of fuel used by the main engines and the amount of fuel which would have been used by the APU for at least one first aircraft takeoff or first aircraft landing during the fuel reporting time period.

2. The diagnostics and prognostics evaluation method of claim 1, wherein the first aircraft has a model and each of the multiple aircraft have the same model as the first aircraft.

3. The diagnostics and prognostics evaluation method of claim 1, wherein the taxi operational event and the corresponding taxi operational event include an ETS turn performance operational event.

4. The diagnostics and prognostics evaluation method of claim 3, wherein the first performance parameter includes a maximum nose wheel side load during the ETS turn performance operational event.

5. The diagnostics and prognostics evaluation method of claim 1, wherein the taxi operational event and the corresponding taxi operational event include an ETS acceleration operational event.

6. The diagnostics and prognostics evaluation method of claim 5, wherein the first performance parameter includes one of a time to a commanded speed during the ETS acceleration operational event, power used by the APU to power the ETS during the ETS acceleration operational event, or fuel used by the APU to power the ETS during the ETS acceleration operational event.

7. The diagnostics and prognostics evaluation method of claim 1, wherein the taxi operational event and the corresponding taxi operational event include an ETS deceleration operational event.

8. The diagnostics and prognostics evaluation method of claim 7, wherein the first performance parameter includes a time to a zero speed during the ETS deceleration operational event.

9. The diagnostics and prognostics evaluation method of claim 1, wherein the taxi operational event and the corresponding taxi operational event occur while there is a significant environmental condition at the airport.

10. The diagnostics and prognostics evaluation method of claim 1, wherein the taxi operational event and the corresponding taxi operational event occur at the same airport.

11. The diagnostics and prognostics evaluation method of claim 1, wherein the taxi data includes motor voltage and motor current and wherein the amount of fuel used by an APU of the first aircraft to power the ETS system during each ETS-use reporting time period is estimated in response to the motor voltage and the motor current.

12. The diagnostics and prognostics evaluation method of claim 1, further comprising:
   receiving, with the computer, electronically recorded taxi data and aircraft identification information from a second aircraft with an electric taxi system, the taxi data including position and corresponding auxiliary power unit status, electric taxi system status, and aircraft speed for each second aircraft takeoff and each second aircraft landing for the predetermined fuel reporting time period;
   determining, with the computer, second ETS-use reporting time periods during all second aircraft takeoffs or second aircraft landings for the predetermined fuel reporting time period during which motive power was supplied to the second aircraft from the electric taxi system, in response to the taxi data;
   determining, with the computer, an electric taxi system configuration, an aircraft configuration, and a main engine configuration of the second aircraft in response to the aircraft identification information;
   estimating, with the computer electric taxi system performance model, an amount of fuel used by an APU of the second aircraft to power the ETS system during each second ETS-use reporting time period in response to the taxi data and the electric taxi system configuration;
   determining in response to the position data for the first aircraft and the second aircraft, the estimated amounts of fuel used by an APU of the first aircraft or the second aircraft to power the ETS system during each of the ETS-use reporting time periods at an airport; and
   calculating with the computer, an optimal ETS taxi target speed for the airport, in response at least in part to the estimated amounts of fuel used by the APU of the first aircraft or the second aircraft to power the ETS system during each of the ETS-use reporting time periods at the airport.

13. The diagnostics and prognostics evaluation method of claim 1, wherein the taxi data from the first aircraft was electronically recorded during a significant environmental condition; and further comprising:
   receiving, with the computer, electronically recorded taxi data and aircraft identification information from a second aircraft with an electric taxi system during a significant environmental condition, the taxi data including position and corresponding auxiliary power unit status, electric taxi system status, and aircraft speed for each second aircraft takeoff and each second aircraft landing for the predetermined fuel reporting time period;
   determining, with the computer, second ETS-use reporting time periods during all second aircraft takeoffs or second aircraft landings for the predetermined fuel reporting time period during which motive power was supplied to the second aircraft from the electric taxi system, in response to the taxi data;
   determining, with the computer, an electric taxi system configuration, an aircraft configuration, and a main engine configuration of the second aircraft in response to the aircraft identification information;
   estimating, with the computer electric taxi system performance model, an amount of fuel used by an APU of the second aircraft to power the ETS system during each ETS-use reporting time period in response to the taxi data and the electric taxi system configuration; and
   calculating with the computer, an optimal ETS taxi target speed for the environmental condition, in response at least in part to the estimated amounts of fuel used by the APU of the first aircraft or the second aircraft to power the ETS system during the ETS-use reporting time periods.

14. The diagnostics and prognostics evaluation method of claim 1, further comprising calculating with the computer, a first aircraft financial fuel savings in response to the first aircraft amount of fuel saved and a fuel cost obtained by the computer from an outside database.

* * * * *